United States Patent
Wertz et al.

(10) Patent No.: US 10,155,187 B2
(45) Date of Patent: *Dec. 18, 2018

(54) FILTER MEDIA WITH A MULTI-LAYER STRUCTURE

(71) Applicant: Hollingsworth & Vose Company, East Walpole, MA (US)

(72) Inventors: John A. Wertz, Hollis, NH (US); Douglas M. Guimond, Pepperell, MA (US)

(73) Assignee: Hollingsworth & Vose Company, East Walpole, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/984,406

(22) Filed: Dec. 30, 2015

(65) Prior Publication Data

US 2016/0184751 A1 Jun. 30, 2016

Related U.S. Application Data

(63) Continuation of application No. 14/169,994, filed on Jan. 31, 2014, now Pat. No. 9,283,501, which is a (Continued)

(51) Int. Cl.
    *B01D 46/00* (2006.01)
    *B01D 39/16* (2006.01)
    *B01D 46/54* (2006.01)

(52) U.S. Cl.
    CPC ....... *B01D 39/163* (2013.01); *B01D 39/1615* (2013.01); *B01D 46/546* (2013.01);
    (Continued)

(58) Field of Classification Search
    CPC .. B01D 39/00; B01D 39/163; B01D 39/1615; B01D 46/00; B01D 46/546;
    (Continued)

(56) References Cited

U.S. PATENT DOCUMENTS

| 853,981 A | 5/1907 | Kneuper |
| 2,196,821 A | 4/1940 | Arnold |

(Continued)

FOREIGN PATENT DOCUMENTS

| CN | 1275923 A | 12/2000 |
| DE | 3341486 A1 | 5/1985 |

(Continued)

OTHER PUBLICATIONS

Extended European Search Report for EP 11775517.3 dated Oct. 9, 2013.

(Continued)

*Primary Examiner* — T. Bennett McKenzie

(74) *Attorney, Agent, or Firm* — Wolf, Greenfield & Sacks, P.C.

(57) ABSTRACT

Filter media are described. The filter media may include multiple layers. In some embodiments, the filter media include a nanofiber layer adhered to another layer. In some embodiments, the layer to which the nanofiber layer is adhered is formed of multiple fiber types (e.g., fibers that give rise to structures having different air permeabilities and/or pressure drops). In some embodiments, the nanofiber layer is adhered to a single-phase or a multi-phase layer. In some embodiments, the nanofiber layer is manufactured from a meltblown process. The filter media may be designed to have advantageous properties including, in some cases, a high dust particle capture efficiency and/or a high dust holding capacity.

22 Claims, 9 Drawing Sheets

Related U.S. Application Data continuation of application No. 12/768,318, filed on Apr. 27, 2010, now Pat. No. 8,679,218.

(52) U.S. Cl.
CPC .............. *B01D 2239/025* (2013.01); *B01D 2239/0622* (2013.01); *B01D 2239/0672* (2013.01); *Y10T 442/659* (2015.04); *Y10T 442/664* (2015.04); *Y10T 442/695* (2015.04)

(58) Field of Classification Search
CPC ...... B01D 2239/025; B01D 2239/0622; B01D 2239/0672; Y10T 442/659; Y10T 442/664; Y10T 442/695
USPC ...................................................... 210/491
See application file for complete search history.

(56) References Cited

U.S. PATENT DOCUMENTS

| | | |
|---|---|---|
| 2,392,901 A | 1/1946 | Brown |
| 2,928,765 A | 3/1960 | Kurjan et al. |
| 3,353,682 A | 11/1967 | Pall et al. |
| 3,849,241 A | 11/1974 | Butin et al. |
| 3,855,133 A | 12/1974 | Roehsler |
| 3,944,686 A | 3/1976 | Froberg |
| 4,018,646 A | 4/1977 | Ruffo et al. |
| 4,033,881 A | 7/1977 | Pall |
| 4,048,953 A | 9/1977 | Froberg |
| 4,188,197 A | 2/1980 | Amberkar et al. |
| 4,455,195 A | 6/1984 | Kinsley |
| 4,483,771 A | 11/1984 | Koch et al. |
| 4,622,259 A | 11/1986 | McAmish et al. |
| 4,701,197 A | 10/1987 | Thornton et al. |
| 4,759,989 A | 7/1988 | Abe et al. |
| 4,765,812 A | 8/1988 | Homonoff et al. |
| 4,765,915 A | 8/1988 | Diehl |
| 4,824,451 A | 4/1989 | Vogt et al. |
| 4,851,304 A | 7/1989 | Miwa et al. |
| 4,892,667 A | 1/1990 | Parker, III et al. |
| 4,904,385 A | 2/1990 | Wessling et al. |
| 4,925,601 A | 5/1990 | Vogt et al. |
| 5,021,284 A | 6/1991 | Miwa et al. |
| 5,108,474 A | 4/1992 | Reidy et al. |
| 5,108,827 A | 4/1992 | Gessner |
| 5,135,719 A | 8/1992 | Hillman et al. |
| 5,167,765 A | 12/1992 | Nielsen et al. |
| 5,178,931 A | 1/1993 | Perkins et al. |
| 5,238,474 A | 8/1993 | Kahlbaugh et al. |
| 5,240,479 A | 8/1993 | Bachinski |
| 5,288,402 A * | 2/1994 | Yoshida ............. B01D 39/1623 210/488 |
| 5,290,446 A | 3/1994 | Degen et al. |
| 5,306,321 A | 4/1994 | Osendorf |
| 5,342,424 A | 8/1994 | Pfeffer |
| 5,401,446 A | 3/1995 | Tsai et al. |
| 5,496,507 A | 3/1996 | Angadjivand et al. |
| 5,567,231 A | 10/1996 | Yokoo et al. |
| 5,571,604 A | 11/1996 | Sprang et al. |
| 5,580,459 A | 12/1996 | Powers et al. |
| 5,582,907 A | 12/1996 | Pall |
| 5,620,785 A | 4/1997 | Watt et al. |
| 5,647,881 A | 7/1997 | Zhang et al. |
| 5,648,027 A | 7/1997 | Tajiri et al. |
| 5,652,049 A | 7/1997 | Suzuki |
| 5,672,188 A | 9/1997 | Choi |
| 5,672,399 A | 9/1997 | Kahlbaugh et al. |
| 5,679,042 A | 10/1997 | Varona |
| 5,702,616 A | 12/1997 | Degen et al. |
| 5,708,162 A | 1/1998 | Hilbig et al. |
| 5,783,503 A | 7/1998 | Gillespie et al. |
| 5,785,725 A | 7/1998 | Cusick et al. |
| 5,786,065 A | 7/1998 | Annis et al. |
| 5,804,512 A | 9/1998 | Lickfield et al. |
| 5,820,645 A | 10/1998 | Murphy |
| 5,935,883 A | 8/1999 | Pike |
| 5,952,251 A | 9/1999 | Jackson et al. |
| 5,955,174 A | 9/1999 | Wadsworth et al. |
| 5,993,501 A | 11/1999 | Cusick et al. |
| 6,007,608 A | 12/1999 | Johnson |
| 6,034,008 A | 3/2000 | Lim et al. |
| 6,099,729 A | 8/2000 | Cella et al. |
| 6,113,784 A | 9/2000 | Stoyell et al. |
| 6,120,939 A | 9/2000 | Whear et al. |
| 6,123,752 A | 9/2000 | Wu et al. |
| 6,171,369 B1 | 1/2001 | Schultink et al. |
| 6,171,684 B1 | 1/2001 | Kahlbaugh et al. |
| 6,183,536 B1 | 2/2001 | Schultink et al. |
| 6,193,773 B1 | 2/2001 | Schlor et al. |
| 6,251,224 B1 | 6/2001 | Dong |
| 6,261,979 B1 | 7/2001 | Tanaka et al. |
| 6,267,252 B1 | 7/2001 | Amsler |
| 6,315,805 B1 | 11/2001 | Strauss |
| 6,315,806 B1 | 11/2001 | Torobin et al. |
| 6,372,004 B1 | 4/2002 | Schultink et al. |
| 6,428,610 B1 | 8/2002 | Tsai et al. |
| 6,476,135 B1 | 11/2002 | Bugada et al. |
| 6,489,051 B1 | 12/2002 | Inoue |
| 6,517,612 B1 | 2/2003 | Crouch et al. |
| 6,554,881 B1 | 4/2003 | Healey |
| 6,576,323 B2 | 6/2003 | Wise et al. |
| 6,579,350 B2 | 6/2003 | Doherty |
| 6,603,054 B2 | 8/2003 | Chen et al. |
| H2086 H | 10/2003 | Amsler |
| 6,706,086 B2 | 3/2004 | Emig et al. |
| 6,713,034 B2 | 3/2004 | Nakamura et al. |
| 6,743,273 B2 | 6/2004 | Chung et al. |
| 6,746,517 B2 | 6/2004 | Benson et al. |
| 6,759,356 B1 | 7/2004 | Myers |
| 6,858,057 B2 | 2/2005 | Healey |
| 6,872,311 B2 | 3/2005 | Koslow |
| 6,872,431 B2 | 3/2005 | Kahlbaugh et al. |
| 6,924,028 B2 | 8/2005 | Chung et al. |
| 6,936,554 B1 | 8/2005 | Singer et al. |
| 6,955,775 B2 | 10/2005 | Chung et al. |
| 6,977,111 B2 | 12/2005 | Yamaguchi et al. |
| 6,986,804 B2 | 1/2006 | Dominiak et al. |
| 7,008,465 B2 | 3/2006 | Graham et al. |
| 7,070,640 B2 | 7/2006 | Chung et al. |
| 7,097,694 B1 | 8/2006 | Jaroszczyk et al. |
| 7,137,510 B1 | 11/2006 | Klein et al. |
| 7,144,533 B2 | 12/2006 | Koslow |
| 7,163,625 B1 | 1/2007 | Williamson et al. |
| 7,179,317 B2 | 2/2007 | Chung et al. |
| 7,235,122 B2 | 6/2007 | Bryner et al. |
| 7,278,542 B2 | 10/2007 | Dussaud et al. |
| 7,309,372 B2 | 12/2007 | Kahlbaugh et al. |
| 7,314,497 B2 | 1/2008 | Kahlbaugh et al. |
| 7,316,723 B2 | 1/2008 | Chung et al. |
| 7,318,852 B2 | 1/2008 | Chung et al. |
| 7,319,122 B2 | 1/2008 | Cheng et al. |
| 7,390,760 B1 | 6/2008 | Chen et al. |
| 7,491,770 B2 | 2/2009 | Autran et al. |
| 7,578,938 B2 | 8/2009 | Rokman et al. |
| 7,597,773 B2 | 10/2009 | Kume et al. |
| 7,603,917 B2 | 10/2009 | Graham et al. |
| 7,645,312 B2 | 1/2010 | Hamlin et al. |
| 7,781,527 B2 | 8/2010 | Autran et al. |
| 7,918,913 B2 | 4/2011 | Kalayci et al. |
| 7,930,760 B2 | 4/2011 | Coles et al. |
| 7,960,478 B2 | 6/2011 | Autran et al. |
| 7,985,802 B2 | 7/2011 | Chien et al. |
| 8,133,306 B2 | 3/2012 | Quayle et al. |
| 8,545,587 B2 | 10/2013 | Guimond et al. |
| 8,608,817 B2 | 12/2013 | Wertz et al. |
| 8,679,218 B2 | 3/2014 | Guimond et al. |
| 9,283,501 B2 | 3/2016 | Wertz et al. |
| 2001/0003082 A1 | 6/2001 | Kahlbaugh et al. |
| 2001/0035094 A1 | 11/2001 | Takagaki et al. |
| 2001/0045086 A1 | 11/2001 | Cox et al. |
| 2002/0013112 A1 | 1/2002 | Bontaites et al. |
| 2002/0056684 A1 | 5/2002 | Klein |
| 2002/0083837 A1 | 7/2002 | Doherty |
| 2002/0193553 A1 | 12/2002 | Qin et al. |

(56) References Cited

U.S. PATENT DOCUMENTS

| | | |
|---|---|---|
| 2003/0003834 A1 | 1/2003 | Berrigan et al. |
| 2003/0010210 A1 | 1/2003 | Kawano et al. |
| 2003/0057613 A1 | 3/2003 | Bansal et al. |
| 2003/0082979 A1 | 5/2003 | Bean et al. |
| 2003/0106294 A1 | 6/2003 | Chung et al. |
| 2003/0150199 A1 | 8/2003 | Tanaka et al. |
| 2003/0168401 A1 | 9/2003 | Koslow |
| 2003/0177909 A1 | 9/2003 | Koslow |
| 2003/0196963 A1 | 10/2003 | Koslow |
| 2003/0196964 A1 | 10/2003 | Koslow |
| 2003/0201231 A1 | 10/2003 | Koslow |
| 2003/0203696 A1 | 10/2003 | Healey |
| 2003/0205529 A1 | 11/2003 | Koslow |
| 2003/0205530 A1 | 11/2003 | Koslow |
| 2003/0205531 A1 | 11/2003 | Koslow |
| 2003/0207635 A1 | 11/2003 | Minemura et al. |
| 2003/0211799 A1 | 11/2003 | Yao et al. |
| 2003/0211802 A1 | 11/2003 | Keck et al. |
| 2003/0213750 A1 | 11/2003 | Koslow |
| 2003/0220039 A1 | 11/2003 | Chen et al. |
| 2003/0226792 A1 | 12/2003 | Tumbrink et al. |
| 2004/0038014 A1 | 2/2004 | Schaefer et al. |
| 2004/0060268 A1 | 4/2004 | Chung et al. |
| 2004/0060269 A1 | 4/2004 | Chung et al. |
| 2004/0083695 A1 | 5/2004 | Schultink et al. |
| 2004/0112023 A1 | 6/2004 | Choi |
| 2004/0116026 A1 | 6/2004 | Kubose et al. |
| 2004/0116028 A1 | 6/2004 | Bryner |
| 2004/0123572 A1 | 7/2004 | Chung et al. |
| 2004/0135274 A1 | 7/2004 | Matsuda et al. |
| 2004/0163540 A1 | 8/2004 | Mori et al. |
| 2004/0178142 A1 | 9/2004 | Koslow |
| 2004/0187454 A1 | 9/2004 | Chung et al. |
| 2004/0211160 A1 | 10/2004 | Rammig et al. |
| 2004/0226886 A1 | 11/2004 | Hester et al. |
| 2004/0255783 A1 | 12/2004 | Graham et al. |
| 2004/0266300 A1 | 12/2004 | Isele et al. |
| 2005/0006303 A1 | 1/2005 | Sanders |
| 2005/0026526 A1* | 2/2005 | Verdegan ............ B01D 39/16 442/340 |
| 2005/0079379 A1 | 4/2005 | Wadsworth et al. |
| 2005/0109393 A1 | 5/2005 | Anderson |
| 2005/0109554 A1 | 5/2005 | Ishikawa et al. |
| 2005/0109557 A1 | 5/2005 | Dravet et al. |
| 2005/0136292 A1 | 6/2005 | Mariani et al. |
| 2005/0148261 A1 | 7/2005 | Close et al. |
| 2005/0183405 A1 | 8/2005 | Gillingham et al. |
| 2005/0193696 A1 | 9/2005 | Muller et al. |
| 2005/0210844 A1 | 9/2005 | Kahlbaugh et al. |
| 2005/0217226 A1 | 10/2005 | Sundet et al. |
| 2005/0235619 A1 | 10/2005 | Heinz et al. |
| 2005/0240517 A1 | 10/2005 | Wolzenski et al. |
| 2005/0241598 A1 | 11/2005 | Ezaki |
| 2005/0250726 A1 | 11/2005 | Krieg et al. |
| 2005/0266760 A1 | 12/2005 | Chhabra et al. |
| 2006/0000196 A1 | 1/2006 | Beier et al. |
| 2006/0084341 A1 | 4/2006 | Bodaghi et al. |
| 2006/0096260 A1 | 5/2006 | Bryner et al. |
| 2006/0096263 A1* | 5/2006 | Kahlbaugh ........ B01D 39/2024 55/527 |
| 2006/0096932 A1 | 5/2006 | Dema et al. |
| 2006/0117728 A1 | 6/2006 | Dolan et al. |
| 2006/0137317 A1 | 6/2006 | Bryner et al. |
| 2006/0137318 A1 | 6/2006 | Lim et al. |
| 2006/0169144 A1 | 8/2006 | Forslund |
| 2006/0196359 A1 | 9/2006 | Gillingham et al. |
| 2006/0205306 A1 | 9/2006 | Rock et al. |
| 2006/0230731 A1 | 10/2006 | Kalayci |
| 2006/0272303 A1 | 12/2006 | Fujiwara et al. |
| 2006/0277877 A1* | 12/2006 | Shields ................ B01D 39/16 55/486 |
| 2006/0292947 A1 | 12/2006 | LaVietes et al. |
| 2007/0021021 A1 | 1/2007 | Verdegan et al. |
| 2007/0039300 A1 | 2/2007 | Kahlbaugh et al. |
| 2007/0054579 A1 | 3/2007 | Baker et al. |
| 2007/0065643 A1 | 3/2007 | Kopacz et al. |
| 2007/0066176 A1 | 3/2007 | Wenstrup et al. |
| 2007/0074628 A1 | 4/2007 | Jones et al. |
| 2007/0075015 A1 | 4/2007 | Bates et al. |
| 2007/0084786 A1 | 4/2007 | Smithies |
| 2007/0125700 A1 | 6/2007 | Ding et al. |
| 2007/0138698 A1 | 6/2007 | Gerndt et al. |
| 2007/0175192 A1 | 8/2007 | Niakan et al. |
| 2007/0175195 A1 | 8/2007 | Skirius et al. |
| 2007/0180997 A1 | 8/2007 | Leir et al. |
| 2007/0190319 A1 | 8/2007 | Kalayci |
| 2007/0220852 A1 | 9/2007 | Lifshutz et al. |
| 2007/0264520 A1 | 11/2007 | Wood et al. |
| 2007/0271883 A1 | 11/2007 | Chung et al. |
| 2007/0283808 A1 | 12/2007 | Chung et al. |
| 2008/0017038 A1 | 1/2008 | Wu |
| 2008/0022643 A1 | 1/2008 | Fox et al. |
| 2008/0026659 A1 | 1/2008 | Brandner et al. |
| 2008/0026661 A1 | 1/2008 | Fox et al. |
| 2008/0032110 A1 | 2/2008 | Wood et al. |
| 2008/0060328 A1 | 3/2008 | Devine |
| 2008/0069991 A1 | 3/2008 | Kohli et al. |
| 2008/0073296 A1 | 3/2008 | Dema et al. |
| 2008/0105626 A1 | 5/2008 | Jones et al. |
| 2008/0108265 A1 | 5/2008 | Pourdeyhimi et al. |
| 2008/0110822 A1 | 5/2008 | Chung et al. |
| 2008/0134652 A1 | 6/2008 | Lim et al. |
| 2008/0160856 A1 | 7/2008 | Chen et al. |
| 2008/0217239 A1* | 9/2008 | Chen ................ B01D 39/1623 210/490 |
| 2008/0245037 A1 | 10/2008 | Rogers et al. |
| 2008/0264259 A1 | 10/2008 | Leung |
| 2008/0302072 A1 | 12/2008 | Hassmann et al. |
| 2008/0302242 A1 | 12/2008 | Schelling et al. |
| 2008/0314009 A1 | 12/2008 | Ziebold et al. |
| 2008/0314010 A1 | 12/2008 | Smithies et al. |
| 2008/0318014 A1 | 12/2008 | Angadjivand et al. |
| 2009/0017710 A1 | 1/2009 | Bugada et al. |
| 2009/0039013 A1 | 2/2009 | Sakadume et al. |
| 2009/0042475 A1 | 2/2009 | Pourdeyhimi |
| 2009/0044702 A1 | 2/2009 | Adamek et al. |
| 2009/0050578 A1 | 2/2009 | Israel et al. |
| 2009/0065436 A1 | 3/2009 | Kalayci et al. |
| 2009/0077938 A1 | 3/2009 | Kume et al. |
| 2009/0078637 A1 | 3/2009 | Shane |
| 2009/0118451 A1 | 5/2009 | Fuchs et al. |
| 2009/0120048 A1 | 5/2009 | Wertz et al. |
| 2009/0120868 A1 | 5/2009 | Huppchen et al. |
| 2009/0142234 A1 | 6/2009 | Tatarchuk et al. |
| 2009/0261035 A1 | 10/2009 | Arora et al. |
| 2009/0266759 A1 | 10/2009 | Green |
| 2009/0301304 A1 | 12/2009 | Bass et al. |
| 2010/0000411 A1 | 1/2010 | Wertz et al. |
| 2010/0031618 A1 | 2/2010 | Grove, III |
| 2010/0044289 A1 | 2/2010 | Koslow |
| 2010/0107881 A1 | 5/2010 | Healey et al. |
| 2010/0116138 A1 | 5/2010 | Guimond et al. |
| 2010/0133173 A1 | 6/2010 | Ingaki |
| 2010/0176068 A1 | 7/2010 | Dallas et al. |
| 2010/0187171 A1 | 7/2010 | Gupta |
| 2010/0187712 A1 | 7/2010 | Gupta et al. |
| 2010/0233927 A1 | 9/2010 | Standaert |
| 2010/0252510 A1 | 10/2010 | Godsay et al. |
| 2010/0282682 A1 | 11/2010 | Eaton et al. |
| 2010/0285101 A1 | 11/2010 | Moore et al. |
| 2010/0297720 A1 | 11/2010 | Medoff et al. |
| 2010/0323573 A1 | 12/2010 | Chu et al. |
| 2011/0059668 A1 | 3/2011 | Bieser et al. |
| 2011/0079553 A1 | 4/2011 | Thomson et al. |
| 2011/0139706 A1 | 6/2011 | Kalayci et al. |
| 2011/0147301 A1 | 6/2011 | Johnson et al. |
| 2011/0147976 A1 | 6/2011 | Wertz et al. |
| 2011/0151737 A1 | 6/2011 | Moore et al. |
| 2011/0215046 A1 | 9/2011 | Rogers et al. |
| 2011/0259813 A1 | 10/2011 | Wertz et al. |
| 2012/0067814 A1 | 3/2012 | Guimond et al. |
| 2012/0108714 A1 | 5/2012 | Wittner |
| 2012/0152821 A1 | 6/2012 | Cox et al. |
| 2012/0152824 A1 | 6/2012 | Cox et al. |

(56) References Cited

U.S. PATENT DOCUMENTS

| | | |
|---|---|---|
| 2012/0318754 A1 | 12/2012 | Cox et al. |
| 2013/0008846 A1 | 1/2013 | Rogers et al. |
| 2014/0144113 A1 | 5/2014 | Wertz et al. |
| 2014/0197095 A1 | 7/2014 | Demmel et al. |
| 2016/0158677 A1 | 6/2016 | Cox et al. |

FOREIGN PATENT DOCUMENTS

| | | |
|---|---|---|
| DE | 19854565 A1 | 5/2000 |
| DE | 19922326 B4 | 2/2004 |
| DE | 10 2005 055 607 B3 | 3/2007 |
| DE | 20 2005 019 004 U1 | 4/2007 |
| DE | 10 2005 059 214 B4 | 10/2007 |
| DE | 10 2006 017 553 B3 | 12/2007 |
| DE | 20 2007 015 994 U1 | 1/2008 |
| EP | 0 109 282 A2 | 9/1988 |
| EP | 0 462 574 A1 | 12/1991 |
| EP | 0 537 140 B1 | 10/1994 |
| EP | 0 847 784 A1 | 6/1998 |
| EP | 0 847 785 A1 | 6/1998 |
| EP | 0 847 786 A1 | 6/1998 |
| EP | 1 048 335 A1 | 11/2000 |
| EP | 0 719 172 B1 | 4/2002 |
| EP | 1 236 494 B1 | 9/2002 |
| EP | 0 793 990 B1 | 3/2003 |
| EP | 1 048 335 B1 | 4/2005 |
| EP | 1 721 555 A1 | 11/2006 |
| EP | 1 775 006 A1 | 4/2007 |
| EP | 1 795 248 A2 | 3/2008 |
| EP | 1 483 039 B1 | 4/2008 |
| FR | 2828114 A1 | 2/2003 |
| GB | 1526448 A | 9/1978 |
| JP | H05-49825 A | 3/1993 |
| JP | 10-230114 A | 9/1998 |
| JP | 2008-095266 A | 4/2008 |
| WO | WO 00/02006 A2 | 1/2000 |
| WO | WO 01/98574 A2 | 12/2001 |
| WO | WO 02/16681 A1 | 2/2002 |
| WO | WO 02/20668 A2 | 3/2002 |
| WO | WO 03/064006 A1 | 8/2003 |
| WO | WO 03/064013 A1 | 8/2003 |
| WO | WO 2004/028662 A2 | 4/2004 |
| WO | WO 2004/033069 A2 | 4/2004 |
| WO | WO 2004/069378 A2 | 8/2004 |
| WO | WO 2004/112937 A1 | 12/2004 |
| WO | WO 2004/112956 A1 | 12/2004 |
| WO | WO 2005/034659 A2 | 4/2005 |
| WO | WO 2006/030407 A1 | 3/2006 |
| WO | WO 2006/049664 A1 | 5/2006 |
| WO | WO 2006/053295 A1 | 5/2006 |
| WO | WO 2006/071979 A1 | 7/2006 |
| WO | WO 2006/071980 A1 | 7/2006 |
| WO | WO 2006/096180 A1 | 9/2006 |
| WO | WO 2007/024445 A1 | 3/2007 |
| WO | WO 2007/041310 A2 | 4/2007 |
| WO | WO 2007/041311 A2 | 4/2007 |
| WO | WO 2007/068302 A1 | 6/2007 |
| WO | WO 2007/068408 A1 | 6/2007 |
| WO | WO 2007/068444 A1 | 6/2007 |
| WO | WO 2007/076015 A2 | 7/2007 |
| WO | WO 2007/112443 A2 | 10/2007 |
| WO | WO 2008/011450 A1 | 1/2008 |
| WO | WO 2008/016771 A1 | 2/2008 |
| WO | WO 2008/052970 A1 | 5/2008 |
| WO | WO 2008/057397 A1 | 5/2008 |
| WO | WO 2008/057431 A2 | 5/2008 |
| WO | WO 2008/066813 A2 | 6/2008 |
| WO | WO 2008/103821 A2 | 8/2008 |
| WO | WO 2008/150548 A2 | 12/2008 |
| WO | WO 2009/062009 A2 | 5/2009 |
| WO | WO 2009/085679 A1 | 7/2009 |
| WO | WO 2010/101640 A1 | 9/2010 |
| WO | WO 2011/058118 A1 | 5/2011 |

OTHER PUBLICATIONS

International Search Report and Written Opinion for PCT/US2011/034074 dated Jul. 11, 2011.
International Preliminary Report on Patentability for PCT/US2011/034074 dated Nov. 8, 2012.
[No Author Listed] HV Product Table. Hollingsworth & Vose. Table. 1 page. (FL6330-FH619).
[No Author Listed] Polymer Degradation and Stability research Developments. Albertov, Ed. 2007. Nova Science Publishers. Book Description and Table of Contents. Accessed from <https://www.novapublishers.com/catalog/product_info.php?products_id=5855> on Sep. 17, 2015.
Berkalp, Air Permeability & Porosity in Spun-laced Fabrics. Fibres and Textiles in Eastern Europe. 2006; 14(3): 81-5.
Bresee et al. Influence of Processing Conditions on Melt Blown Web Structure: Part 1—DCD. INJ Spring 2004, p. 49-55.
Bresee et al. Influence of Processing Conditions on Melt Blown Web Structure: Part 2—Primary Airflow Rate. INJ Summer 2005, p. 11-8.
Bresee et al. Influence of Processing Conditions on Melt Blown Web Structure: Part 3—Water Quench. INJ Winter 2005, p. 27-35.
Dahiya et al., Melt Blown Technology. Apr. 2004. 13 pages.
Deka et al., Filtration News. 2004;22(4): :24, 26, 28, 30, 32 and 33.
Grafe et al., Polymeric Nanofibers and Nanofiber Webs: A New Class of Nonwovens. INJ Spring 2003: 51-5.
Kaukopaasi et al, Nonwoven Conference, 1991, p. 137-54.
Kaukopaasi et al, TAPPI Journal. 1992;75(1):127-32.
Keith et al., The Surface Area of Fibrous Filters. Tobacco Science. 1977;68-72. Accessed Sep. 19, 2013.
Lloyd et al., TAPPI Journal. 1998;81(11):194-202.
Montefusco et al., Filtration and Separation. 2005;42(2):30-1.
Nayak, Fabrication and characterization of polypropylene nanofibres by melt electrospinning and meltblowing. Doctoral Thesis. RMIT University, School of Fashion and Textiles. Mar. 2012.
Rodman et al., Fibers for nonwovens with emphasis on filtration theory and applications. Albany International Research Co. Mansfield, MA. pp. 233-246, date N/A.
Shin et al., A Fundamental Investigation of the Formation and Properties of Electrospun Fibers. National Textile Center Annual Report. Nov. 2001; M98-D01: 9 pages.
Warner et al., A Fundamental Investigation of the Formation and Properties of Electrospun Fibers. National Textile Center Annual Report. Nov. 1999; M98-D01: 10 pages.
U.S. Appl. No. 12/971,456, filed Dec. 17, 2010, Wertz et al.
U.S. Appl. No. 12/971,539, filed Dec. 17, 2010, Cox et al.
U.S. Appl. No. 14/584,155, filed Dec. 29, 2014, Thomson et al.
U.S. Appl. No. 14/874,561, filed Oct. 5, 2015, Cox et al.
U.S. Appl. No. 13/528,796, filed Jun. 20, 2012, Cox et al.
U.S. Appl. No. 13/901,951, filed May 24, 2013, Anantharamaiah et al.

\* cited by examiner

FILTER MEDIA WITH A MULTI-LAYER STRUCTURE

RELATED APPLICATIONS

This application is a continuation of U.S. application Ser. No. 14/169,994, filed Jan. 31, 2014, which is a continuation of U.S. application Ser. No. 12/768,318 (now U.S. Pat. No. 8,679,218), filed Apr. 27, 2010, which are incorporated herein by reference in their entirety.

FIELD OF INVENTION

The disclosure relates generally to filtration and, more particularly, to filter media, related systems, components and methods.

BACKGROUND OF INVENTION

Filter elements can be used to remove contamination in a variety of applications. Such elements can include a filter media which may be formed of a web of fibers. The fiber web provides a porous structure that permits fluid (e.g., gas, liquid) to flow through the media. Contaminant particles (e.g., dust particles, soot particles) contained within the fluid may be trapped on the fiber web. Depending on the application, the filter media may be designed to have different performance characteristics.

Dust holding capacity is a measure of the amount of dust captured on the filter media under certain conditions. Dust capture efficiency is a measure of the concentration of dust that passes through the filter as compared to the concentration of dust prior to passing through the filter. In some applications, it is desirable for the filter media to have a high dust holding capacity and/or a high dust capture efficiency.

SUMMARY OF INVENTION

Aspects presented herein relate to filter media.

In one aspect, a filter media is provided. The filter media includes a first layer comprising a first phase including a first plurality of fibers and a second plurality of fibers different from the first plurality of fibers; and a second phase including a third plurality of fibers and a fourth plurality of fibers different from the third plurality of fibers, the third plurality of fibers being the same as or different from the first or second plurality of fibers and the fourth plurality of fibers being the same as or different from the first or second plurality of fibers, wherein the air permeability of the first plurality of fibers is greater than the air permeability of the second plurality of fibers and the air permeability of the third plurality of fibers is greater than the air permeability of the fourth plurality of fibers. The filter media also includes a second layer attached to the first layer, wherein the second layer is a nanofiber layer.

In another aspect, a filter media is provided. The filter media includes a first layer including a plurality of cellulose fibers; and a second layer attached to the first layer, wherein the second layer is a nanofiber layer, and wherein the filter media has a dust holding capacity of at least 200 g/m$^2$ and an initial efficiency of at least 80%.

In a further aspect, a method of manufacturing a filter media is provided. The method includes forming a first layer comprising forming a first phase including a first plurality of fibers and a second plurality of fibers different from the first plurality of fibers; and forming a second phase including a third plurality of fibers and a fourth plurality of fibers different from the third plurality of fibers, the third plurality of fibers being the same as or different from the first or second plurality of fibers and the fourth plurality of fibers being the same as or different from the first or second plurality of fibers, wherein the air permeability of the first plurality of fibers is greater than the air permeability of the second plurality of fibers and the air permeability of the third plurality of fibers is greater than the air permeability of the fourth plurality of fibers. The method also includes forming a nanofiber layer; and adhering the first layer and the nanofiber layer together to form a fiber composite.

Other aspects, embodiments, features will become apparent from the following description. Each reference incorporated herein by reference is incorporated in its entirety. In cases of conflict or inconsistency between an incorporated reference and the present specification, the present specification will control.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Filter media are described. The filter media may include multiple layers, as described further below. In some embodiments, the filter media includes a nanofiber layer adhered to another layer. In some embodiments, the layer to which the nanofiber layer is adhered is formed of multiple fiber types (e.g., fibers that give rise to structures having different air permeabilities and/or pressure drops). The filter media may be designed to have advantageous properties including, in some cases, a high dust particle capture efficiency and/or a high dust holding capacity.

Figure 1:
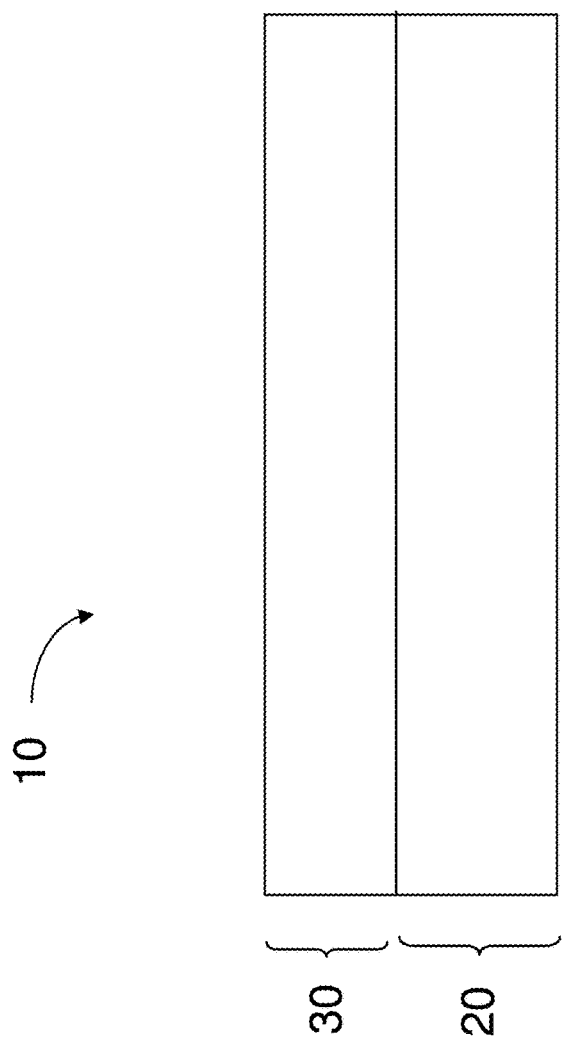
FIG. 1 depicts an embodiment of a filter media having a first layer and a second layer.
Figure 2:
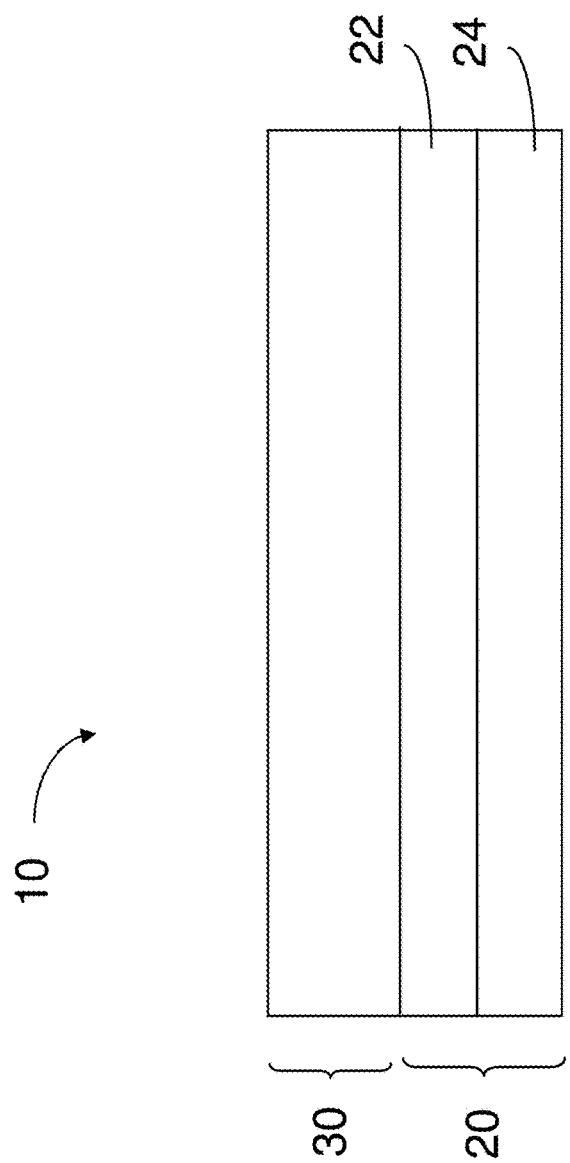
FIG. 2 illustrates an embodiment of a filter media having a first layer and a second layer where the first layer includes multiple phases.

For example, FIGS. 1 and 2 depict illustrative embodiments of a filter media 10 having a first layer 20 and a second layer 30. In some embodiments, first layer 20 includes a number of different kinds of fibers and second layer 30 is a nanofiber layer. In some embodiments, layer 20 is upstream of layer 30 when fluid flows through the media. In other embodiments, layer 20 is downstream of layer 30 when fluid flows through the media. In some cases, first layer 20 may include a single phase, such as an open phase or a tight phase, described further below. In other cases, as illustrated in FIG. 2, first layer 20 may be a multi-phase layer having a first phase 22 (e.g., open phase) and a second phase 24 (e.g., tight phase). In some embodiments, first phase 22 may be a tight phase and second phase 24 may be an open phase. It can be appreciated that any number of phases may be incorporated in first layer 20.

It should be understood that the term "filter media" is used herein in singular or plural form. When referring to a single filter media, the term "filter media" may be used interchangeably with the term "filter medium."

Figure 3:
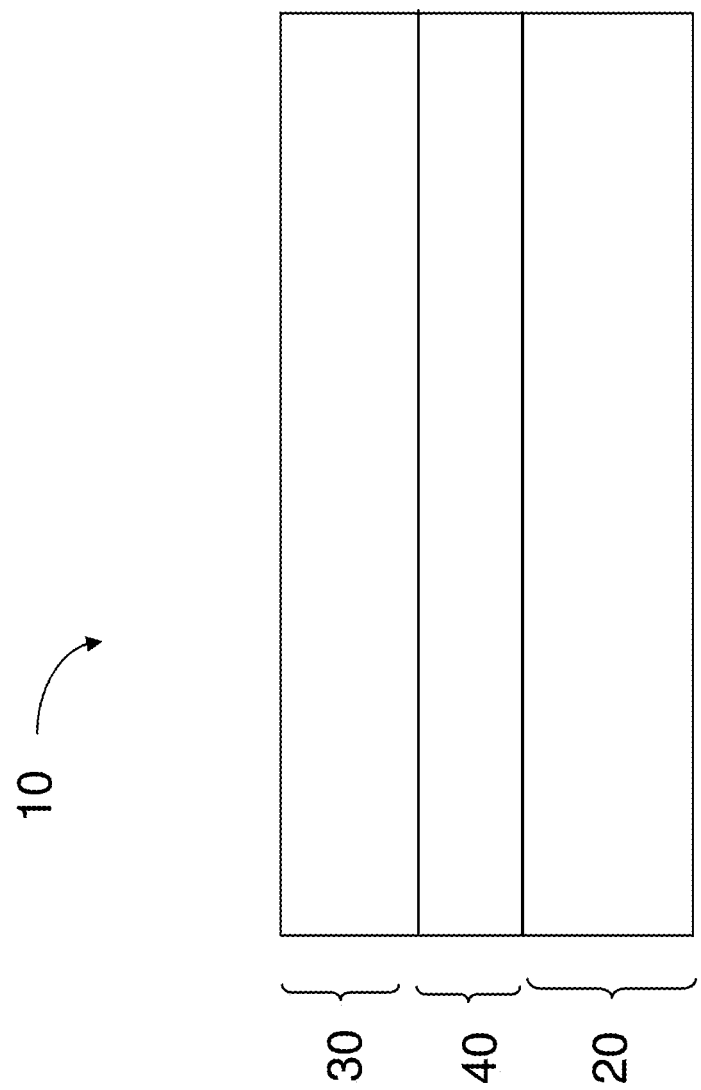
FIG. 3 illustrates an embodiment of a filter media having a first layer, a second layer and an intermediate layer.
Figure 4:
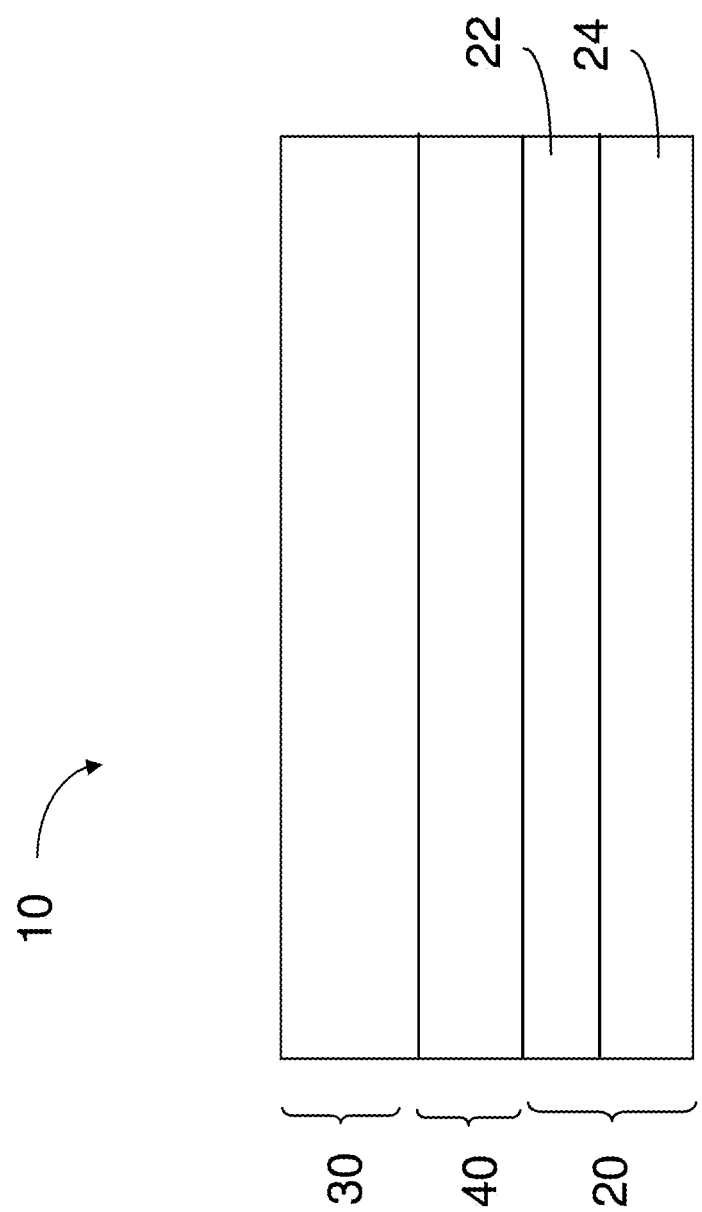
FIG. 4 illustrates an embodiment of a filter media having a first layer that includes multiple phases, an intermediate layer and a second layer.

Further, FIGS. 3 and 4 depict illustrative embodiments of a filter media 10 having an intermediate layer 40 disposed between first layer 20 and second layer 30. In some embodiments, as shown in FIG. 3, intermediate layer 40 may be an adhesive, described further below. Depicted in FIG. 4, in other embodiments, intermediate layer 40 may be included in an arrangement where the intermediate layer 40 is disposed between a first layer 20 having a first phase 22 and a second phase 24, and a second layer 30.

I. Single-Phase or Multi-Phase Layer Structure

As discussed, filter media 10 having a layer 20 with multiple fiber types may include one or more phases that give rise to different air permeabilities and/or pressure drop characteristics within those phases. In some embodiments, such as that shown in FIG. 2, a filter media 10 may have a first phase 22 that has a larger air permeability and/or a smaller pressure drop than that of a second phase 24. In some cases, a phase having a larger air permeability and/or a smaller pressure drop may be referred to as an open phase, whereas a phase having a smaller air permeability and/or a larger pressure drop may be referred to as a tight phase.

In an example, a filter media 10 may include an open phase 22 that is provided substantially over a tight phase 24. For instances where open and tight phases are formed in a filter media, the position of open and tight phases may depend on the particular embodiment. It is possible for an open phase to be disposed over a tight phase and vice versa. Accordingly, an open phase may be positioned upstream relative to a tight phase and vice versa. However, it should be understood that a first layer 20 of a filter media 10 can have any number of open and/or tight phases. Indeed, a first layer 20 may include two or more open and/or tight phases. As described herein, a layer in a filter media may include one or more phases (e.g., open or tight). In embodiments in which a layer includes more than one phase, each phase may have different fiber types and/or different characteristics, as described further below. In some embodiments, phases may be laminated together or formed simultaneously on a papermaking machine, also as described below.

In some embodiments, filter media having a first layer with multiple phases (e.g., open and tight phases) may exhibit improved dust holding capacity and/or dust capture efficiency as compared to a filter media that has a first layer with a single phase structure. Though, alternatively, in some instances, a single phase layer may exhibit improved dust holding capacity and/or dust capture efficiency over multi-phase layers.

It should be understood that a first layer 20 can be utilized independently as a filter media. However, certain embodiments presented herein incorporate a first layer 20 into filter media 10 having other components.

Suitable multi-phase layers have been described in commonly-owned U.S. patent application Ser. No. 12/488,033, entitled "Multi-Phase Filter Medium," filed on Jun. 19, 2009 which is incorporated herein by reference in its entirety.

A. Open Phase

An open phase in a filter media may include a first plurality of fibers and a second plurality of fibers, although in some embodiments, only a first plurality of fibers is used to form the open phase.

In some embodiments, the first plurality of fibers have an air permeability larger than that of the second plurality of fibers. For example, the first plurality of fibers can have an air permeability from about 50 cubic feet per minute ("CFM") to about 350 CFM (e.g., from about 100 CFM to about 200 CFM), and the second plurality of fibers can have an air permeability from about 5 CFM to about 50 CFM (e.g., from about 8 CFM to about 37 CFM or from about 15 CFM to about 25 CFM). As used herein, air permeability of fibers is determined by measuring the air permeability of a hand sheet produced exclusively of such fibers and having a basis weight of 100 g/m² according to ISO 9237.

In some embodiments, the first plurality of fibers have a pressure drop smaller than that of the second plurality of fibers. For example, the first plurality of fibers can have a pressure drop from about 5 Pascals ("Pa") to about 300 Pa (e.g., from about 10 Pa to about 250 Pa or from about 20 Pa to about 100 Pa), and the second plurality of fibers can have a pressure drop from about 300 Pa to about 1,000 Pa (e.g., from about 350 Pa to about 500 Pa). As used herein, pressure drop of fibers is determined by using a gas having a face velocity of 40 cm/s on a hand sheet produced exclusively of such fibers and having a basis weight of 100 g/m² according to ASTM F778-88.

In some embodiments, the first plurality of fibers have an average fiber length larger than that of the second plurality of fibers. For example, the first plurality of fibers can have an average fiber length from about 1.5 mm to about 6 mm (e.g., from about 2.5 mm to about 4.5 mm), and the second plurality of fibers can have an average fiber length from about 0.5 mm to about 2 mm (e.g., from about 0.7 mm to about 1.5 mm).

In general, the materials that can be used to form the first and second pluralities of fibers can vary as desired. In some embodiments, the first plurality of fibers are made from softwood fibers, cotton fibers, glass fibers, polyester fibers, polyvinyl alcohol binder fibers, and/or rayon fibers. Exemplary softwood fibers include fibers obtained from mercerized southern pine ("mercerized southern pine fibers or HPZ fibers"), northern bleached softwood kraft (e.g., fibers obtained from *Robur* Flash ("*Robur* Flash fibers")), southern bleached softwood kraft (e.g., fibers obtained from Brunswick pine ("Brunswick pine fibers")), or chemically treated mechanical pulps ("CTMP fibers"). For example, HPZ fibers can be obtained from Buckeye Technologies, Inc., Memphis, Tenn.; *Robur* Flash fibers can be obtained from Rottneros AB, Stockholm, Sweden; and Brunswick pine fibers can be obtained from Georgia-Pacific, Atlanta, Ga.

In some embodiments, the second plurality of fibers are made from hardwood fibers, polyethylene fibers, or polypropylene fibers. Exemplary hardwood fibers include fibers obtained from *Eucalyptus* ("*Eucalyptus* fibers"). *Eucalyptus* fibers are commercially available from, e.g., (1) Suzano Group, Suzano, Brazil ("Suzano fibers"), (2) Group Portucel Soporcel, Cacia, Portugal ("Cacia fibers"), (3) Tembec, Inc., Temiscaming, QC, Canada ("Tarascon fibers"), (4) Kartonimex Intercell, Duesseldorf, Germany, ("Acacia fibers"), (5) Mead-Westvaco, Stamford, Conn. ("Westvaco fibers"), and (6) Georgia-Pacific, Atlanta, Ga. ("Leaf River fibers"). In general, softwood fibers have a relatively large air permeability, small pressure drop, and large average fiber length as compared to hardwood fibers.

In some embodiments, an open phase can include a mixture of softwood fibers and hardwood fibers. In certain embodiments, the open phase can include only one type of fibers (e.g., softwood fibers) uniformly distributed within the open phase.

In some embodiments, an open phase can include a mixture of fibers with different characteristics (e.g., different air permeabilities and/or pressure drops). Fibers with different characteristics can be made from one material (e.g., by using different process conditions) or different materials.

In some embodiments, the first plurality of fibers can be formed from a material identical to the material used to form the second plurality of fibers. In such embodiments, the first and second pluralities of fibers can be prepared by using different preparation methods, or different conditions in the same preparation method, such that they have different characteristics (e.g., different air permeabilities or pressure drops). In certain embodiments, the first and second pluralities of fibers can be formed of the same material and also have the same characteristics. In some embodiments, the first plurality of fibers can be formed from a material different from the material used to form the second plurality of fibers.

Generally, the weight ratio of the first and second plurality of fibers can vary depending on the desired properties of the filter media. For instance, an open phase in a filter media may include fibers with a larger air permeability and/or a smaller pressure drop in an amount larger than the amount of fibers with a smaller air permeability and/or a larger pressure drop. In some embodiments, a weight ratio of the first and second pluralities of fibers described above can range from about 50:50 to about 97:3 (e.g., from about 50:50 to about 70:30 or from about 60:40 to about 70:30). As used herein, the weight of the first or second plurality of fibers refers to the initial weight of each group of fibers in a composition (e.g., a pulp) used to prepare the open phase. In certain embodiments, an open phase in a filter media can include fibers with a larger air permeability and/or a smaller pressure drop in an amount equal to or smaller than the amount of fibers with a smaller air permeability and/or a larger pressure drop.

In some embodiments, an open phase can include one or more pluralities of fibers in addition to the first and second pluralities of fibers. Each of the additional pluralities of fibers can have characteristics (e.g., air permeability and/or pressure drop) different from the first or second plurality of fibers, and/or can be prepared from a material different from those used to prepare the first or second plurality of fibers. In some embodiments, an additional plurality of fibers can be prepared from a material identical to a material used to form one of the first and second pluralities of fibers, but still have characteristics different from those of the first or second plurality of fibers.

B. Tight Phase

A tight phase in a filter media may include a third plurality of fibers and a fourth plurality of fibers.

In some embodiments, the third plurality of fibers can have the same characteristics (e.g., air permeability and/or pressure drop) and/or be made from the same type of material as the first or second plurality of fibers described above, and/or the fourth plurality of fibers can have the same characteristics and/or be made from the same type of material as the first or second plurality of fibers described above.

In some embodiments, the third plurality of fibers can have one or more characteristics (e.g., air permeability and/or pressure drop), and/or be made from a type of material, different from those of the first or second plurality of fibers, and/or the fourth plurality of fibers can have one or more characteristics, and/or be made from a type of material, different from those of the first or second plurality of fibers.

In some embodiments, a tight phase can include a mixture of softwood fibers and hardwood fibers. In certain embodiments, the tight phase can include only one type of fibers (e.g., hardwood fibers) uniformly distributed within the tight phase.

In some embodiments, a tight phase can include a mixture of fibers with different characteristics (e.g., different air permeabilities and/or pressure drops). Fibers with different characteristics can be made from one material (e.g., by using different process conditions) or different materials.

In some embodiments, the third plurality of fibers are made from softwood fibers, cotton fibers, glass fibers, polyester fibers, polyvinyl alcohol binder fibers, and/or rayon fibers. Exemplary softwood fibers include mercerized southern pine fibers or HPZ fibers, northern bleached softwood kraft fibers (e.g., *Robur* Flash fibers), southern bleached softwood kraft fibers (e.g., Brunswick pine fibers) or CTMP fibers.

In some embodiments, the fourth plurality of fibers are made from hardwood fibers, polyethylene fibers, or polypropylene fibers. Exemplary hardwood fibers include *Eucalyptus* fibers (e.g., Suzano fibers, *Cacia* fibers, Tarascon fibers, *Acacia* fibers, Westvaco fibers, Leaf River fibers).

In some embodiments, the third plurality of fibers can be formed from a material identical to the material used to form the fourth plurality of fibers. In such embodiments, the third and fourth pluralities of fibers can be prepared by using different preparation methods, or different conditions in the same preparation method, such that they have different characteristics (e.g., different air permeability or pressure drop). In certain embodiments, the third and fourth pluralities of fibers can be formed of the same material and also have the same characteristics. In some embodiments, the third plurality of fibers can be formed from a material different from the material used to form the fourth plurality of fibers.

Generally, the weight ratio of the third and fourth plurality of fibers can vary depending on the desired properties of the filter media or its intended uses. A tight phase in a filter media may include fibers with a higher air permeability and/or a smaller pressure drop in an amount smaller than the amount of fibers with a smaller air permeability and/or a larger pressure drop. For example, a weight ratio of the third and fourth pluralities of fibers described above can range from about 3:97 to about 50:50 (e.g., from about 25:75 to about 50:50 or from about 70:30 to about 50:50). As used herein, the weight of the third or fourth plurality of fibers refers to the initial weight of each group of fibers in a composition (e.g., a pulp) used to prepare the tight phase. In some embodiments, a tight phase in a filter media can include fibers with a higher air permeability and/or a smaller pressure drop in an amount larger than or equal to the amount of fibers with a smaller air permeability and/or a larger pressure drop.

In some embodiments, a tight phase can include one or more pluralities of fibers in addition to the third and fourth pluralities of fibers. Each of the additional pluralities of fibers can have characteristics (e.g., air permeability or pressure drop) different from the third or fourth plurality of fibers, and/or can be prepared from a material different from those used to prepare the third or fourth plurality of fibers.

In some embodiments, an additional plurality of fibers can be prepared from a material identical to a material used to form one of the third and fourth pluralities of fibers, but still have characteristics different from those of the third or fourth plurality of fibers.

In general, the weight ratio of the open and tight phases in a filter media can vary as desired. For example, a basis weight ratio of the open and tight phases can range from about 10:90 to about 90:10 (e.g., from about 30:70 to about 70:30, from about 40:60 to about 60:40, or from about 30:70 to about 90:10). In certain embodiments, the basis weight ratio of the open and tight phases is about 30:70 or greater (e.g., about 40:60 or greater, about 50:50 or greater, or about 60:40 or greater). As used herein, basis weight of an open or tight phase refers to the weight of the phase over a unit area (e.g., per square meter). For example, the basis weight of an open or tight phase can have a unit of grams per square meter.

C. Additional Features of a Single-Phase or Multi-Phase Layer

As discussed above, filter media 10 may include a first layer 20 that is single-phase or multi-phase, having an open phase, a tight phase or both.

The first layer 20 of a filter media 10 may include any desired percentage of softwood fibers. For example, the first layer 20 may include a weight percentage of softwood fibers of at least about 50%, at least about 60% or at least about 80% of the weight composition of the first layer.

Similarly, the first layer 20 of a filter media 10 may include any desired percentage of hardwood fibers. For example, the first layer 20 may include a weight percentage of hardwood fibers of less than about 50%, less than about 30%, less than about 20%, less than about 10% or 0% of the weight composition of the first layer.

Further, in some embodiments, additional fibers may be included in the first layer 20 of a filter media 10. For instance, additional fibers may include a weight percentage of synthetic fibers (e.g., polyester, polypropylene) in the first layer of 0%, greater than 5%, greater than 10%, greater than 20% or greater than 30% of the weight composition of the first layer.

In some embodiments, synthetic fibers included in the first layer 20 of a filter media 10 may have a denier of between about 0.5 and about 6.0, between about 0.5 and about 1.5, between about 1.5 and about 3.0, or between about 3.0 and about 6.0. In some embodiments, synthetic fibers may have a denier of at least about 1.5 or at least about 3.0.

Additional fibers of any particular denier may be included in the first layer 20 of a filter media 10 in any desired amount. In some embodiments, the first layer 20 may include a weight percentage of synthetic fibers in the first layer having a denier of at least 1.5 of 0%, greater than 5%, greater than 10%, greater than 20%, or greater than 30% of the weight composition of the first layer. In other embodiments, the first layer 20 may include a weight percentage of synthetic fibers in the first layer having a denier of at least 3.0 of 0%, greater than 10%, greater than 20%, or greater than 30% of the weight composition of the first layer.

In general, the thickness of the first layer 20 of a filter media 10 may vary as desired. For example, the first layer 20 can have a thickness from 100 microns to 2,000 microns (e.g., from 200 microns to 1,600 microns or from 400 microns to 1,200 microns). The thickness may be determined according to the standard TAPPI T411.

The first layer 20 of a filter media 10 may have any suitable basis weight. For example, the first layer 20 can have a basis weight of at least about 10 g/m$^2$ and/or at most about 500 g/m$^2$ (e.g. between about 25 g/m$^2$ and about 230 g/m$^2$ or between about 80 g/m$^2$ and about 150 g/m$^2$). As used herein, basis weight of the first layer 20 refers to the weight of the media over a unit area (e.g., per square meter). A typical unit for the basis weight is g/m$^2$.

The air permeability of the first layer 20 of a filter media 10 can usually be selected as desired. For example, the air permeability of the first layer 20 can range between about 1 CFM and about 300 CFM (e.g., between about 1 CFM and about 250 CFM, between about 2 CFM and about 250 CFM, between about 2 CFM and about 300 CFM, between about 30 CFM and about 120 CFM, or between about 100 CFM and about 200 CFM). As used herein, air permeability of a filter media is determined according to ISO 9237.

The average pore size of the first layer 20 of a filter media 10 can vary as desired. For example, the first layer 20 can have an average pore size from at least about 3 microns and/or at most about 1,000 microns (e.g., between about 30 microns and 400 microns). In some embodiments, the average pore size of the first layer 20 having a single phase (e.g., open phase) may range between about 50 microns and about 200 microns or between about 75 microns and about 150 microns. In other embodiments, the average pore size of an open phase portion of the first layer 20 may range between about 100 microns and about 400 microns or between about 150 microns and about 200 microns. In further embodiments where the first layer 20 has more than one phase, the average pore size of a tight phase portion of a filter media may range between about 30 microns and about 200 microns or between about 50 microns and about 125 microns. As used herein, the average pore size refers to the mean flow pore size measured by using a Coulter Porometer as described in ASTM F316-03.

In general, the properties of filter media may be assessed using a Palas flat sheet test. Such testing is based on the following parameters: A 100 cm$^2$ surface area of a filter media is challenged with a fine dust particles (0.1-80 μm) at a concentration of 200 mg/m$^3$ with a face velocity of 20 cm/s for one minute. The dust capture efficiency is measured using a Palas MFP2000 fractional efficiency photodetector. The dust capture efficiency is [(1−[C/C0])*100%], where C is the dust particle concentration after passage through the filter and C0 is the particle concentration before passage through the filter. The dust capture efficiency is measured after one minute and is referred to herein as the initial dust capture efficiency. The dust holding capacity is measured when the pressure drop across the media reaches 1,800 Pa, and is the difference in the weight of the filter media before the exposure to the fine dust and the weight of the filter media after the exposure to the fine dust.

The first layer 20 of a filter media 10 can exhibit an advantageous ability to capture dust. For example, the first layer 20 can have an initial dust capture efficiency of at least about 25% (e.g., at least about 40%, at least about 60) and/or at most about 70% measured according to the Palas flat sheet test, as described above.

The first layer 20 of a filter media 10 can also have good dust holding properties. For example, the first layer 20 can have a dust holding capacity (DHC) of at least about 30 g/m$^2$ (e.g., at least about 100 g/m$^2$, at least about 200 g/m$^2$, or at least about 300 g/m$^2$) and/or at most about 400 g/m$^2$ (e.g., at most about 350 g/m$^2$, at most about 300 g/m$^2$, at most about 250 g/m$^2$ or at most about 200 g/m$^2$) according to a Palas flat sheet test. As used herein, DHC is the weight of dust captured divided by the test area of the Palas test sheet. As another example, the first layer 20 can have a specific dust holding capacity of at least about 0.001 g/g (e.g., at least about 0.004 g/g) and/or at most about 1.0 g/g (e.g., at most about 0.9 g/g). As used herein, specific dust holding capacity can be calculated by dividing the weight of dust captured over a unit weight (e.g., per gram) of the Palas test sheet. Alternatively, specific dust holding capacity can be calculated by dividing the weight of dust captured over a unit thickness (e.g., per millimeter) of the Palas test sheet. In such alternate case, the specific dust holding capacity shall be expressed in units of g/mm.

In some embodiments, the first layer 20 of a filter media 10 has both advantageous dust capture and dust holding properties combined. As an example, the first layer 20 can have an initial dust capture efficiency of at least about 25% (e.g., at least about 40%, at least about 60%) and a dust holding capacity of at least about 30 g/m$^2$ (e.g., at least about 100 g/m$^2$ at least about 200 g/m$^2$, or at least about 300 g/m$^2$).

In some embodiments, at least one of the first, second, third, and fourth pluralities of fibers described above are made from an organic polymeric material (e.g., softwood fibers, cotton fibers, hardwood fibers, or synthetic organic polymers such as polyester or rayon). In certain embodiments, more than one (e.g., two, three, or all) of the first, second, third and fourth pluralities of fibers are made from an organic polymeric material. In some embodiments, at least one of the the first, second, third, and fourth pluralities of fibers described above are made from cellulose.

In some embodiments, the first layer 20 of a filter media 10 can further include a binder. In general, including a binder in the first layer 20 can significantly increase its strength (e.g., tensile strength measured according to ISO 1924-2 or Mullen Burst strength measured according to DIN 53113). The binder can include a polymeric material, such as polyvinyl acetate, an epoxy, a polyester, a polyvinyl alcohol, an acrylic (e.g., a styrene acrylic), or a phenolic resin. In some embodiments, the binder can be at least about 2% and/or at most about 50% (e.g., at most about 35%, at most about 25%, at most about 15%, or at most about 5%) of the weight composition of the first layer. In some embodiments, the binder can be present in the first layer between about 10% and about 50%, or between about 15% and about 30% of the weight composition of the first layer. In general, the binder can be present in the first layer with or without the presence of cross-linking agents (e.g., melamine, hexamine, or an epoxy hardener) or other additives (e.g., silicones, fluorocarbons, or catalysts such as ammonium chloride).

In some cases, a filter media having a multi-phase structure includes an interface between a first phase and a second phase. In some embodiments, when the multi-phase structure is prepared in a continuous wet laid process (e.g., forming first and second phases in a continuous liquid-based coating process), the interface can take the form of a transition phase which includes at least a portion of each of the first, second, third, and fourth pluralities of fibers intermingled with each other. Without wishing to be bound by theory, it is believed that an interface prepared by such a process can be substantially non-linear due to the interaction between the fibers in the first and second phases. In addition, as no adhesive is typically used in a wet laid process, the interface is typically substantially free of any adhesive. First and second phases which include an interface that is substantially free of an adhesive may be joined by, for example, physical interactions between the fibers in each of the phases, or by other suitable methods that do not involve the use of an adhesive to join the phases. In some cases, first and second phases which include an interface that is substantially free of an adhesive are not joined by lamination.

In some embodiments, and as discussed above, a first layer of a filter media can include one or more phases in addition to a first phase and a second phase. An additional phase can be the same as or different from a first phase or a second phase. For example, a multi-phase layer having three phases may have any combination of open and/or tight phases.

D. Methods of Manufacturing a Multi-Phase Layer

A multi-phase layer for incorporation in a filter media can be made by any suitable methods.

In some embodiments, a multi-phase layer can be prepared by a wet laid process as follows: First, a first dispersion (e.g., a pulp) containing first and second pluralities of fibers in a solvent (e.g., an aqueous solvent such as water) can be applied onto a wire conveyor in a papermaking machine (e.g., a fourdrinier or a rotoformer) to form a first phase supported by the wire conveyor. A second dispersion (e.g., another pulp) containing third and fourth pluralities of fibers in a solvent (e.g., an aqueous solvent such as water) is then applied onto the first phase. Vacuum is continuously applied to the first and second dispersions of fibers during the above process to remove the solvent from the fibers, thereby resulting in an article containing the first phase and a second phase. In some embodiments, the second phase is brought into contact with the first phase as the vacuum is applied at nearly the same time or soon thereafter.

The article thus formed is then dried and, if necessary, further processed (e.g., calendared) by using known methods to form a multi-phase layer. In some embodiments, first and second phases in a multi-phase layer do not have macroscopic phase separation as shown in a conventional multi-phase layer (e.g., where one sub-layer is laminated onto another sub-layer), but instead contain an interface in which microscopic phase transition occurs depending on the fibers used or the forming process (e.g., how much vacuum is applied).

In some embodiments, a polymeric material can be impregnated into a multi-phase layer either during or after the multi-phase layer is being manufactured on a papermaking machine. For example, during the manufacturing process described above, after the article containing first and second phases is formed and dried, a polymeric material in a water based emulsion or an organic solvent based solution can be adhered to an application roll and then applied to the article under a controlled pressure by using a size press or gravure saturator. The amount of the polymeric material impregnated into the multi-phase layer typically depends on the viscosity, solids content, and absorption rate of the multi-phase layer. As another example, after the multi-phase layer is formed, it can be impregnated with a polymeric material by using a reverse roll applicator following the just-mentioned method and/or by using a dip and squeeze method (e.g., by dipping a dried multi-phase layer into a polymer emulsion or solution and then squeezing out the excess polymer by using a nip). A polymeric material can also be applied to the multi-phase layer by other methods known in the art, such as spraying or foaming.

II. Filter Media with a Nanofiber Layer

As described above, second layer 30 of filter media 10 may be a nanofiber layer 30. For example, the nanofiber layer 30 may be adhered to the first layer 20. In aspects described herein, the first layer 20 may be a single-phase or a multi-phase layer. In some embodiments, a nanofiber layer may be formed from a meltblown process. Suitable meltblown layers have been described in U.S. Patent Publication No. US2009/0120048 which is incorporated herein by reference in its entirety and is based on U.S. patent application Ser. No. 12/266,892, entitled "Meltblown Filter Medium," filed on Nov. 7, 2008.

In other embodiments, the nanofiber layer may be formed via other suitable processes such as meltspun, melt electrospinning and/or liquid electrospinning processes.

A. Nanofiber Layer

In some embodiments, the nanofiber layer 30 may be formed of fibers having an average diameter of at most 1.5 microns (e.g., from 0.1 microns to 1.5 microns, from 0.2 microns to 1.5 microns, from 0.3 microns to 1.5 microns, from 0.3 microns to 1.4 microns, from 0.4 microns to 1.3 microns, from 0.1 microns to 0.5 microns, from 0.1 micron to 0.2 microns, from 0.1 microns to 0.3 microns, from 0.5 microns to 1.5 microns, from 0.5 microns to 1.0 micron, from 0.2 microns to 0.8 microns, from 0.2 microns to 0.5 microns, from 0.3 microns to 0.5 microns, from 0.4 microns to 0.5 microns, from 0.4 microns to 0.6 microns, from 0.4 microns to 0.8 microns, from 0.6 microns to 0.9 microns, from 0.2 microns to 0.4 microns, from 0.2 microns to 0.3 microns, from 0.3 microns to 0.4 microns).

In some embodiments, a nanofiber layer manufactured from a meltblown process may be formed of fibers having an average diameter of at most 1.5 microns (e.g., at most 1.4 microns, at most 1.3 microns, at most 1.2 microns, at most 1.1 microns, at most one micron), and/or at least 0.2 micron (e.g., at least 0.3 micron, at least 0.4 micron, at least 0.5 micron), as measured using scanning electron microscopy. As an example, in some embodiments, the meltblown layer is formed of fibers having an average diameter of from 0.2 micron to 1.5 microns (e.g., from 0.3 microns to 1.5 microns, from 0.3 microns to 1.4 microns, from 0.4 micron to 1.3 microns). As another example, in certain embodiments, the meltblown layer is formed of fibers having an average diameter of from 0.2 microns to 1.5 microns (e.g., from 0.5 microns to 1.5 microns, from 0.5 microns to 1.0 micron, from 0.2 microns to 0.8 microns, from 0.2 microns to 0.5 microns, from 0.3 microns to 0.5 microns, from 0.4 microns to 0.5 microns, from 0.4 microns to 0.6 microns, from 0.4 microns to 0.8 microns, from 0.2 microns to 0.4 microns, from 0.2 microns to 0.3 microns, from 0.3 microns to 0.4 microns). In some cases, at least 5% (e.g., at least 10%, at least 25%, at least 50%, at least 60%, at least 75%) of the fibers in the meltblown material extend a distance of at least 0.3 microns in a direction substantially perpendicular to a surface of a second layer.

The meltblown layer may be formed of fibers having an average length. For example, in some embodiments, the meltblown layer may be formed of fibers having an average length from about 0.1 inches to about 1,000 inches or between about 1 inch and about 100 inches.

The fibers in the meltblown layer may have an average aspect ratio. For example, in some embodiments, fibers in a meltblown layer may have an average aspect ratio between about 5 and about 1,000,000 or between about 10 and about 100,000.

The meltblown material may be formed of one or more polymers (e.g., thermoplastic polymers). Exemplary polymers include polyolefins (e.g., polypropylenes), polyesters (e.g., polybutylene terephthalate, polybutylene naphthalate), polyamides (e.g., nylons), polycarbonates, polyphenylene sulfides, polystyrenes, polybutylene terephthalate, and polyurethanes (e.g., thermoplastic polyurethanes). Optionally, the polymer(s) may contain fluorine atoms. Examples of such polymers include PVDF and PTFE.

The meltblown layer can generally have any suitable thickness. In some embodiments, the meltblown layer is at least 5 microns (e.g. at least 10 microns, at least 20 microns, at least 30 microns) thick, and/or at most 500 microns (e.g., at most 400 microns, at most 200 microns, at most 150 microns) thick. For example, the meltblown layer can be from 5 microns to 500 microns (e.g., from 5 microns to 250 microns, from 10 microns to 200 microns, from 20 microns to 150 microns, from 30 microns to 500 microns, from 50 microns to 100 microns) thick. The thickness of the meltblown layer is determined using scanning electron microscopy in cross-section view.

The basis weight of the meltblown layer can typically be selected as desired. In some embodiments, the basis weight of the meltblown layer is at least 1 $g/m^2$ (e.g., at least 10 $g/m^2$, at least 25 $g/m^2$), and/or at most 100 $g/m^2$ (at most 90 $g/m^2$, at most 75 $g/m^2$). For example, in certain embodiments, the meltblown layer has a basis weight of from 1 $g/m^2$ to 100 $g/m^2$ (e.g., from 10 $g/m^2$ to 90 $g/m^2$, from 25 $g/m^2$ to 75 $g/m^2$, from 2 $g/m^2$ to 20 $g/m^2$, from 4 $g/m^2$ to 12 $g/m^2$).

The average pore size of the meltblown layer can vary as desired. For example, the meltblown layer can have an average pore size that may range between about 5 microns and about 50 microns, between about 10 microns and about 30 microns or between about 10 microns and about 20 microns. As used herein, the average pore size refers to the mean flow pore size measured by using a Coulter Porometer as described in ASTM F316-03.

The air permeability of the meltblown layer can also be varied as desired. In some embodiments, the meltblown layer has an air permeability of at most 500 CFM (e.g., at most 250 CFM, at most 200 CFM), and or at least 20 CFM (e.g., at least 50 CFM, at least 100 CFM). For example, in some embodiments, the air permeability of the meltblown layer can be from 20 CFM to 500 CFM (e.g., from 50 CFM to 250 CFM, from 100 CFM to 200 CFM). In some embodiments, the air permeability of a meltblown layer may be appropriately tailored to meet composite properties based on the permeability of the first layer (e.g., single-phase or multi-phase).

B. Intermediate Layer

1. Adhesive

In some embodiments, the intermediate layer 40 includes an adhesive (e.g., a hot melt adhesive, a pressure sensitive adhesive, a thermoplastic adhesive, a thermoset adhesive) that is adhered to the first layer and the nanofiber (e.g., meltblown) layer. Generally, the adhesive is a polymer. Examples of polymers include ethylene vinyl acetate copolymers, polyolefins (e.g., polyethylenes, polypropylenes, amorphous polyolefin), polyamides (e.g., nylons), epoxies, cyanoacrylates, polyurethanes (e.g., moisture cured polyurethanes) and polyesters. In some embodiments, the adhesive is an ethylene vinyl acetate copolymer. Examples of commercially available materials include amorphous polyolefin adhesives available from Bostik (Wauwatosa, Wis.) under tradenames HM 4379, M2751 and H3199, and from Heartland (Germantown, Wis.) under tradename H312. Examples of commercially available materials also include copolyesters available from Bostik (Wauwatosa, Wis.) under tradenames HM4199, HM4156 and Vitel 4361B. Examples of commercially available materials further include polyamides available from Bostik (Wauwatosa, Wis.) under tradenames HM 4289LV and HM4229.

In some embodiments, the intermediate layer is formed of a web of fibers less than 4 micron in diameter with a geometric standard deviation of 1.4.

The thickness of an adhesive layer can generally be selected as desired. In some embodiments, the thickness of an adhesive layer is at least five microns (e.g., at least 10 microns, at least 25 microns), and/or at most 100 microns (e.g., at most 75 microns, at most 50 microns). For example, the thickness of an adhesive layer can be from five microns to 100 microns (e.g., from five microns to 75 microns, from five microns to 50 microns) as determined by scanning electron microscopy.

In general, the basis weight of an adhesive layer can be selected as desired. In some embodiments, an adhesive layer has a basis weight of at most 20 $g/m^2$ (at most 10 $g/m^2$, at most 8 $g/m^2$, at most 5 $g/m^2$), and/or at least 0.5 $g/m^2$ (e.g., at least 1 $g/m^2$, at least 2 $g/m^2$). For example, in some embodiments, an adhesive layer can have a basis weight of from 1 $g/m^2$ to 20 $g/m^2$ (e.g., 3 $g/m^2$ to 10 $g/m^2$, 0.5 $g/m^2$ to 10 $g/m^2$, from 1 $g/m^2$ to 8 $g/m^2$, from 2 $g/m^2$ to 5 $g/m^2$).

Although in many cases, an adhesive layer is continuous, in some embodiments, an adhesive can be discontinuous. For example, an adhesive may be in the form a material with holes in it (e.g., in the form of a mesh). Additionally or alternatively, an adhesive could be in the form of patches (e.g., dots) of material. Typically, an amount of adhesive between a first layer and a nanofiber (e.g., meltblown) layer is sufficient to provide appropriate adhesion between the layers when considering the intended use of the filter media. For example, in some embodiments, an adhesive is present in at least 70% (e.g., at least 75%, at least 80%, at least 85%, at least 90%, at least 95%, at least 99%, 100%) of the area between a first layer and a nanofiber (e.g., meltblown) layer.

In general, an adhesive is selected so that the mean peel strength between a first layer and a nanofiber (e.g., meltblown) layer is at least 0.5 ounces per inch of width (e.g., at least one ounce per inch of width, or at least 1.5 ounces per inch of width). In some embodiments, an adhesive is selected so that the mean peel strength between a first layer and a nanofiber (e.g., meltblown) layer is at most four ounces per inch of width. As used herein, the "mean peel strength" of a first layer/adhesive/second layer configuration is determined as follows. The test is a modified version of ASTM D903, using a Thwing-Albert Intellect II tensile tester. Samples are cut to two inch by seven inch strips, and the peeling is done in the machine direction. TUFFLEX (TF4150 85447) tape from Intertape Inc. (Montreal, Quebec, Canada) is applied to the length of the coated surface of the specimen to firmly bond to the top layer to be able to separate the laminate. A half inch prepeel is used to start the delamination. The tester cross head and top air grip moves at a speed of 12 inches per minute from the stationary bottom air grip. The test is complete when the cross-head and the top air grip moves four inches from the initial position. The maximum peel strength and minimum peel strength are recorded as a function of the load measured by the load cell. The mean peel strength is calculated from the loads measured by the load cell during the entirety of the test. All peel strengths are divided in half to report a peel strength per inch width by dividing by two.

Generally, an adhesive may be selected to have an appropriate open time for the manufacturing process below. For example, the open time of an adhesive should be sufficient so that it does not become non-adhesive between the time it is applied to one layer (e.g., a first layer or a meltblown layer) and the time the adhesive contacts the other layer (e.g., a first layer or a meltblown layer). In some embodiments, an adhesive has an open time of at least 15 seconds (e.g., at least 20 seconds, at least 30 seconds at least 40 seconds). In certain embodiments, an adhesive layer has an open time of at most 60 seconds. As used herein, the "open time" of an adhesive is determined according to ASTM D4497 using a 1/16 inch wide bead of adhesive.

2. Scrim

In some embodiments, a scrim is included in the filter media. In some cases, a scrim is located above a nanofiber layer 30. In some embodiments, a filter media includes a first layer 20, an intermediate layer 40, a nanofiber layer 30 and a scrim disposed over the nanofiber layer 30.

A scrim can be, for example, formed of a polymer. Examples of polymers include polyesters, polyamides and polyolefins. Optionally, a scrim is formed of a spunbond nonwoven material or a carded nonwoven material. In some embodiments, a scrim is formed of a spunbond polypropylene.

Generally, the thickness of a scrim can be selected as desired. In certain embodiments, a scrim is at least 50 microns (e.g., at least 100 microns, at least 200 microns) thick, and/or at most 1000 microns (e.g., 900 microns, 750 microns) thick. For example, the thickness of a scrim can be from 50 microns to 1000 microns (e.g. from 100 microns to 900 microns, from 250 microns to 750 microns) thick. As referred to herein, the thickness of a scrim is determined according to TAPPI T411.

In general, the basis weight of a scrim can be selected as desired. In some embodiments, a scrim has a basis weight of at most 100 $g/m^2$ (at most 90 $g/m^2$, at most 75 $g/m^2$), and/or at least five $g/m^2$ (e.g., at least 10 $g/m^2$, at least 20 $g/m^2$). For example, in some embodiments, a scrim can have a basis weight of from five $g/m^2$ to 100 $g/m^2$ (e.g., from five $g/m^2$ to 90 $g/m^2$, from five $g/m^2$ to 75 $g/m^2$).

III. Filter Media with Single-Phase or Multi-Phase and Nanofiber Layers

A. Performance Characteristics

Filter media having a first layer (e.g., single phase or multi-phase layer) and a nanofiber layer adhered thereon may exhibit advantageous properties including increased dust holding characteristics such as capture efficiency and dust holding capacity.

According to the Palas flat sheet test, in some embodiments, the dust holding capacity of the filter media having a nanofiber layer adhered to a first layer (e.g., single-phase or multi-phase) may be greater than about 10 $g/m^2$, greater than about 20 $g/m^2$, greater than about 50 $g/m^2$, greater than about 200 $g/m^2$, greater than about 300 $g/m^2$, greater than about 350 $g/m^2$, greater than about 400 $g/m^2$, or greater than about 450 $g/m^2$. In some embodiments, filter media subjected to the Palas flat sheet test may exhibit a dust holding capacity that is at most about 500 $g/m^2$.

It should be understood that the filter media described herein may exhibit any of the above-noted dust holding capacities in combination with the following characteristics.

The initial dust particle capture efficiency may be characterized using the Palas flat sheet test described above. In some embodiments, the initial dust particle capture efficiency of filter media having a nanofiber layer adhered to a first layer (e.g., single-phase or multi-phase) may be greater than about 25%, greater than about 40%, greater than about 70%, greater than about 80%, greater than about 90% or greater than about 99%. In some embodiments, the initial dust particle capture efficiency of such filter media may be at most 99.5%.

The initial pressure drop may also be characterized using the Palas flat sheet test. In some embodiments, the initial pressure drop of filter media having a nanofiber layer adhered to a first layer may be greater than about 10 Pa, greater than about 15 Pa, greater than about 20 Pa or greater than about 30 Pa. In some embodiments, the initial pressure drop of such filter media may be at most about 300 Pa or at most about 500 Pa.

According to the Palas flat sheet test, a certain period of time will elapse until the pressure drop reaches 1,800 Pa. In some embodiments, the period of time for filter media having a first layer and a nanofiber layer may be at least about 60 minutes, at least about 70 minutes, at least about 80 minutes (e.g., about 83 minutes).

Filter media having a nanofiber layer adhered on to a first layer may give rise to certain values of air permeability as well as mechanical performance. For example, the air permeability of such filter media using the above described permeability test may be greater than about 1 CFM, greater than about 2 CFM, greater than about 10 CFM, greater than about 30 CFM, greater than about 50 CFM, greater than about 75 CFM or greater than about 100 CFM. In some embodiments, the filter media may exhibit air permeability of at most about 120 CFM, at most about 200 CFM or at most about 250 CFM.

In some embodiments, a filter media having a first layer and a nanofiber layer may exhibit mechanical strength based on a Mullen Burst test. Mullen Burst test values for such a filter media may be at most about 80 kPa, at most about 90 kPa or at most about 100 kPa according to DIN 53113. In some embodiments, Mullen Burst test values according to the above standard for filter media described may be greater than about 10 kPa, greater than about 15 kPa or greater than about 20 kPa.

B. Structural Characteristics

Various structural properties may be measured of filter media with a nanofiber layer adhered on to a first layer (e.g., single phase or multi-phase layer).

Filter media with a first layer and a nanofiber layer may have any suitable basis weight. For example, filter media having a nanofiber layer adhered on to a first layer can have a basis weight ranging between about 10 g/m² and about 500 g/m², between about 25 g/m² and about 230 g/m², between about 30 g/m² and about 250 g/m², between about 50 g/m² and about 200 g/m², between about 80 g/m² and about 150 g/m², or between about 90 g/m² and about 160 g/m².

The thickness of a filter media having a first layer and a nanofiber layer may vary as desired. For example, filter media with a nanofiber layer adhered on to a first layer can have a thickness, according to TAPPI T411, ranging between about 100 microns and 2 mm, between about 200 microns and 1.6 mm, between about 300 microns and about 2.0 mm, between about 400 microns and 1.2 mm, between about 500 microns and about 1.7 mm or between about 700 microns and about 1.5 mm.

The average pore size of a filter media having a first layer and a nanofiber layer may vary as desired. For example, filter media with a nanofiber layer adhered on to a first layer can have an average pore size ranging between about 5 microns and about 50 microns, between about 10 microns and about 30 microns or between about 10 microns and about 20 microns.

C. Methods of Manufacturing

A nanofiber layer may be manufactured and adhered on to a single-phase or multi-phase layer in any appropriate manner. In some embodiments, a nanofiber layer may be positioned downstream with respect to a single-phase or multi-phase layer or vice versa.

Figure 5:
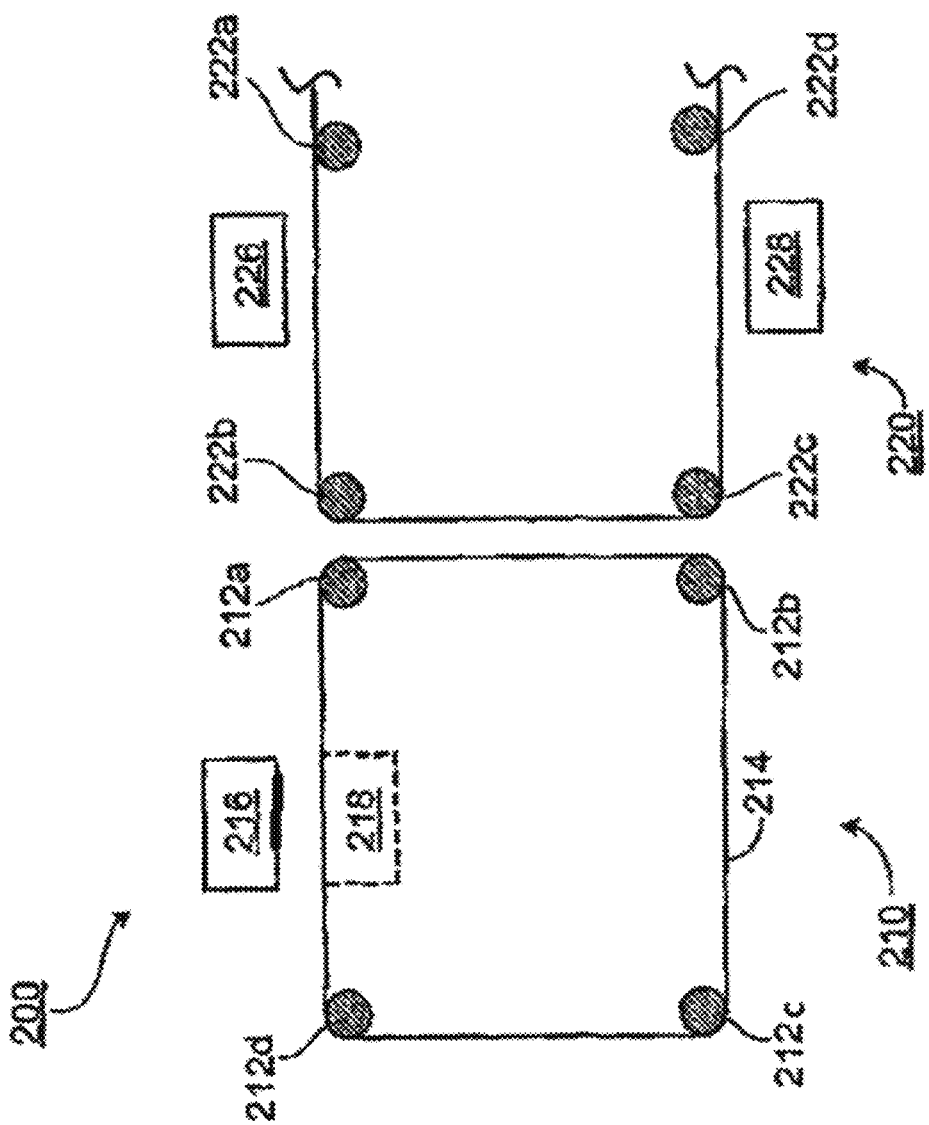
FIG. 5 is a schematic view of a system configured to be used in the manufacture of filter media.

As discussed above, for some embodiments, a nanofiber layer may be produced from a meltblown process. For example, meltblown processes and manufacturing methods described in U.S. Patent Publication No. 2009/0120048, entitled "Meltblown Filter Medium," may be used. FIG. 5 illustrates an embodiment of a system 200 that can be used to form a filter medium having an adhesive layer. System 200 includes a first roll-to-roll system 210 and a second roll-to-roll system 220.

System 210 includes rollers 212a, 212b, 212c and 212d that move a continuous belt 214 as the rollers rotate. System 212 also includes an extruder 216. As rollers 212a-212d are rotating, the polymer(s) (e.g., optionally with one or more additives) are vacuum drawn into the extruder 216, and the polymer is heated (e.g., slowly heated) from the beginning of the extruder to the end, allowing the polymer(s) to flow more easily. The heated polymer(s) is(are) fed into a melt pump which controls the throughput (lb/hr) of the polymer(s). The polymer(s) then goes through a die tip with a series of holes. In some embodiments, the throughput of polymer per hole may have a relatively strong effect on fiber diameter. Heated, high velocity air impinges the polymer on either side of the die tip as the polymer comes out of the die tip.

The size of the holes and number of holes per inch for a die can generally be selected as desired. In some embodiments, the die can have 35 holes per inch with 0.0125" holes. In certain embodiments, the die can have 70 holes per inch with 0.007" holes. Other dies can optionally be used.

Meltblown material that is to be formed into a nanofiber layer may be softened (e.g., melted) by an increased temperature. As an example, in some embodiments, the material is heated to a temperature of at least 350° F. (e.g., at least 375° F., at least 400° F.), and or at most 600° F. (e.g., at most 550° F., at most 500° F.). For example, the material can be heated to a temperature of from 350° F. to 600° F. (e.g., from 375° F. to 550° F., from 400° F. to 500° F.).

In one aspect, process air is heated on either side of a die tip where fibers are formed. This heated air (typically the same temperature as the die tip) impinges the fibers and helps attenuate the fibers to the final fiber size. In some embodiments, as the air volume increases, the fiber diameter can decrease. The process air volume can be selected as appropriate. In some embodiments, the process air volume is at least 2500 pounds/hour-meter (e.g., at least 2750 pounds/hour-meter, at least 3000 pounds/hour-meter), and/or at most 4000 pounds/hour-meter (e.g., at most 3750 pounds/hour-meter, at most 3500 pounds/hour-meter). For example, the process air volume can be from 2500 pounds/hour-meter to 4000 pounds/hour-meter (e.g., from 2750 pounds/hour-meter to 3750 pounds/hour-meter, from 3000 pounds/hour-meter to 3500 pounds/hour-meter).

The vacuum created by vacuum 218 can be selected as appropriate. In some embodiments, the vacuum is at least 10 inches of water (e.g., at least 12 inches of water, at least 14 inches of water), and/or at most 26 inches of water (e.g., at most 23 inches of water, at most 20 inches of water). For example, the vacuum can be from 10 inches of water to 26 inches of water (e.g., from 12 inches of water to 23 inches of water, from 14 inches of water to 20 inches of water).

System 220 includes rollers 222a, 222b, 222c and 222d that move a first layer (e.g., single-phase or multi-phase) as the rollers rotate. Between rollers 222a and 222b, system 220 includes a station 226 that applies an adhesive to the first layer. In a region adjacent rollers 222b and 212a, the adhesive contacts the meltblown layer, and the meltblown layer is removed from belt 214 while adhered to the adhesive to form a composite filter media. In some cases, the first layer/adhesive/meltblown layer composite then passes through a charging unit 228.

It can be appreciated that a nanofiber layer formed from a process other than a meltblown process can be positioned on a belt 214 that is moved by rollers 212a-212d. In such a case when a meltblown process is not used to form a nanofiber layer, an extruder 216 is not necessary. Accordingly, once adhesive is applied to the first layer by station 226, in a region adjacent rollers 222b and 212a, the adhesive contacts the nanofiber layer, and the nanofiber layer is removed from belt 214 while adhered to the adhesive to form a composite filter media. Similar to that described above, a first layer/adhesive/nanofiber layer composite may then pass through a charging unit 228.

Station 226 can generally be selected as desired. In some embodiments (e.g., when it is desirable to have a relatively high coverage of adhesive), station 226 can be a metered adhesive system. The metered adhesive system can be configured to apply a relatively highly dispersed and uniform amount of adhesive. In certain embodiments, station 226 is an adhesion applicator system having 12 nozzles arranged per inch that provides dispersed adhesion lanes with a two millimeter gap between center points of the lanes and with each nozzle having a 0.06 inch diameter orifice.

The belt 214 used to carry the nanofiber layer can be made of any material that allows the formation of a nanofiber layer on the belt, and also allows for the removal of the nanofiber layer from the belt when the nanofiber layer contacts the adhesive layer. Examples of materials from which a belt can be made include polymers (e.g., polyesters, polyamides), metals and/or alloys (e.g., stainless steel, aluminum).

The speed at which a belt 214 moves can be selected as desired to form a nanofiber layer. In some embodiments, the belt 214 may move at a speed of at least 10 ft/min (e.g., at least 20 ft/min, at least 30 ft/min), and/or at most 300 ft/min (e.g., at most 200 ft/min, at most 100 ft/min). For example, the belt 214 can move at a speed of from 10 ft/min to 300 ft/min (e.g., from 20 ft/min to 200 ft/min, from 30 ft/min to 100 ft/min).

In general, any belt configuration can be used. For example, in some embodiments, the belt has an open structure, such as a mesh structure. In some cases, an open structure may result in a nanofiber material having a complementary structure to that of the belt from the nanofiber material being under the force of the blown air.

As discussed above for other processes to form a nanofiber layer from meltblown material, the temperature may be selected to properly soften (e.g., melt) the material that is to be formed into the nanofiber layer. Similarly, process air volume, vacuum strength, and the speed at which the belt moves can be selected as appropriate.

In certain embodiments where an adhesive layer is used, the manufacturing method may involve applying the adhesive layer to a first layer, and the adhesive layer is subsequently joined to the nanofiber layer formed on the collector belt as both layers are passed through a nip roll. Thus, in the filter media, the first layer and the nanofiber layer are both adhered to the adhesive layer. As discussed above, the first layer may be a single-phase or a multi-phase (e.g., dual-phase) layer.

In some embodiments, manufacture of a filter media with an adhesive layer involves a continuous (e.g., roll-to-roll) process. The process can, for example, involve the use of multiple roll-to-roll systems. As an example, one roll-to-roll system can be used to form a nanofiber layer, and another roll-to-roll system can be used to adhere an adhesive layer to the first layer. In such a system, the roll-to-roll systems can be configured so that, in a continuous fashion, the adhesive layer contacts the nanofiber layer as these two layers become adhered to each other.

A roll-to-roll system may include rollers that move the first layer as the rollers rotate. The system may include a station between rollers that applies an adhesive to the first layer. In a region adjacent to rollers, the adhesive contacts the nanofiber layer, and the nanofiber layer is removed from a belt and is adhered to the adhesive as it passes through a nip roll or similar device.

The first layer may be fed through the adhesive station by a pulling force generated via a nip formed at rollers 212a and 222b. By contacting the first layer adjacent a roller 222b with a nanofiber layer adjacent roller 212a, the speed of belt 214 and the first layer are synchronized (e.g., so that the first layer moves at approximately the same speed as the belt). The pressure between rollers 212a and 222b is generally selected as desired for the intended use of the filter media. For example, in embodiments in which the filter media is corrugated, the pressure between rollers 212a and 222b may be selected to achieve good corrugation depth and conformity. In some embodiments, the pressure between rollers 212a and 222b is from 20 pounds per linear inch to 40 pounds per linear inch (e.g., from 25 pounds per linear inch to 35 pounds per linear inch, from 28 pounds per linear inch to 32 pounds per linear inch, from 29 pounds per linear inch to 31 pounds per linear inch, 30 pounds per linear inch).

When applied to the first layer, the temperature of the adhesive can be selected so that it has an appropriate level of tack when it comes into contact with the nanofiber layer. In embodiments in which the adhesive is a hot melt adhesive, this can involve heating the adhesive prior to its application to the first layer. For example, prior to being applied to the first layer, the adhesive can be heated to a temperature of at least 350° F. (e.g., at least 370° F., at least 380° F.), and or at most 450° F. (e.g., at most 430° F., at most 420° F.). For example, the material can be heated to a temperature of from 350° F. to 450° F. (e.g., from 370° F. to 430° F., from 380° F. to 420° F.).

In some embodiments, once formed, a first layer/adhesive/nanofiber layer composite passes through a charging unit. The charging unit is used to charge the composite (in general, particularly the nanofiber layer) which may result in a filter media having enhanced fine particle capture properties.

In general, any of a variety of techniques can be used to charge the first layer/adhesive/nanofiber layer composite to form an electret web. Examples include AC and/or DC corona discharge and friction-based charging techniques. In some embodiments, the composite is subjected to a discharge of at least 1 kV/cm (e.g., at least 5 kV/cm, at least 10 kV/cm), and/or at most 30 kV/cm (e.g., at most 25 kV/cm, at most 20 kV/cm). For example, in certain embodiments, the composite can be subjected to a discharge of from 1 kV/cm to 30 kV/cm (e.g., from 5 kV/cm to 25 kV/cm, from 10 kV/cm to 20 kV/cm).

In some embodiments, similar to that described above for the adhesive, manufacture of a filter media with a scrim layer may involve a continuous (e.g., roll-to-roll) process. The process can, for example, involve the use of multiple roll-to-roll systems. As an example, one roll-to-roll system can be used to form a nanofiber layer on to a scrim, and another roll-to-roll system can be used to carry the first layer. In such a system, the roll-to-roll systems can be configured so that, in a continuous fashion, the nanofiber layer/scrim composite contacts the first layer to form a three layer composite (or four layer including an adhesive), and the three layers are subsequently bonded together.

In an embodiment, a system may include rollers that move a continuous belt and as the rollers rotate, a scrim is applied to the belt. Material from which a nanofiber layer is to be formed (e.g., a polymer in pellet form) may be introduced through a heated extruder while rollers rotate. The material is softened (e.g., melted) and forced through a die in the form of filaments. The filaments are moved toward the scrim under the influence of a vacuum, for example, on the opposite side of the belt relative to the die. In some embodiments, the vacuum stretches the filaments and forces them against the surface of the scrim to provide a nanofiber layer disposed on the scrim.

The scrim/nanofiber layer composite is removed from the belt, and the first layer is disposed on the scrim, typically by adhesive disposed (e.g., sprayed) on to the first layer. In some cases, where nanofibers are formed from a meltblown process, this involves bringing the scrim onto a belt and then blowing meltblown fibers directly onto the scrim. The scrim can have an adhesive applied before the meltblown material is blown on and/or the force and the heat of the meltblown fibers can be used to adhere the two layers together. The three layers are then bonded together. During this process, the three layers can optionally be laminated together. In some embodiments, the layers are ultrasonically bonded together (e.g., ultrasonically point bonded together). In some embodiments, a nanofiber layer, a scrim and the first layer can be joined by applying ultrasonic energy between an aluminum vibrating horn and an engraved contact roll.

D. Corrugation

In some embodiments, filter media can be corrugated. Optionally, corrugated filter media can also be pleated. Any suitable method may be used to corrugate and/or pleat filter media described.

Figure 6:
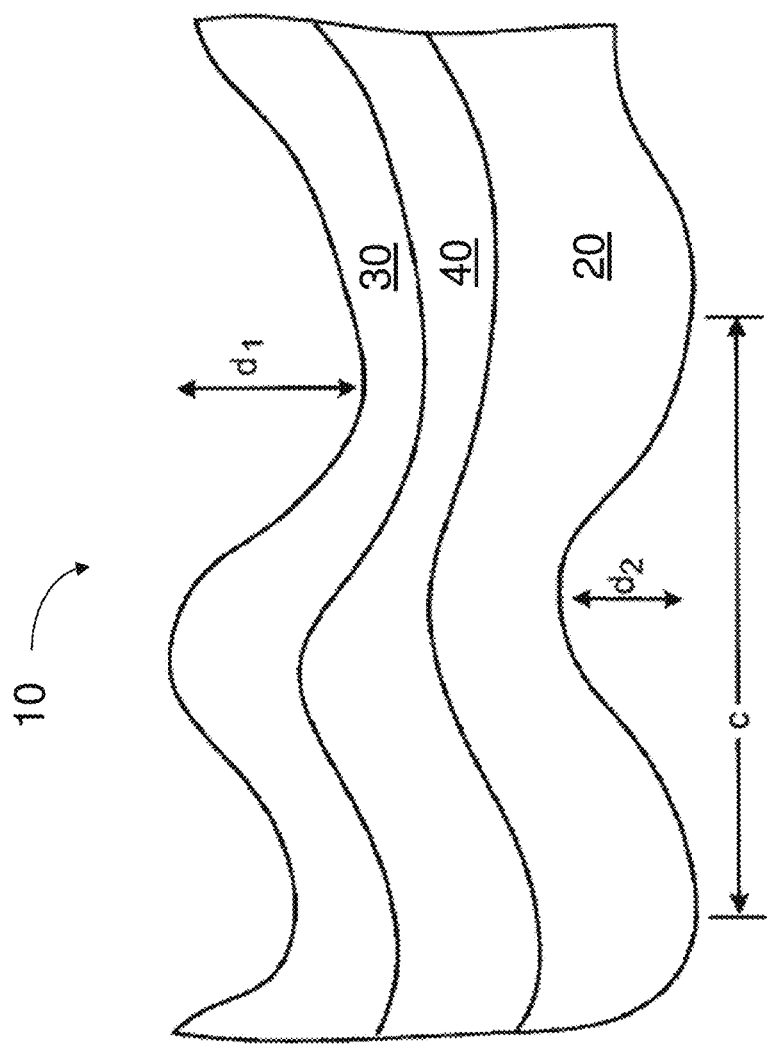
FIG. 6 depicts an embodiment of a corrugated filter media having a first layer, a second layer and an intermediate layer.

FIG. 6 shows a filter media 10 including a first layer 20, an intermediate layer 40 (e.g., adhesive) and a nanofiber layer 30. In some embodiments, first layer 20 includes a single phase or multiple phases. Filter media 10 has a repeat corrugation pattern with a corrugation channel width depicted by a distance "c", which is the distance from one peak to its nearest neighboring peak in the repeat corrugation pattern. In general, filter media 10 can have any desired corrugation channel width. In some embodiments, corrugation channel width "c" is at least 150 mils (e.g., at least 160 mils, from 167 mils to 173 mils, at least 225 mils, at least 250 mils, from 247 mils to 253 mils, from 150 mils to 335 mils).

In some embodiments, filter media 10 has a corrugation depth that is depicted by a distance "$d_1$", which is the distance from a peak of layer 30 to a valley of layer 30 in the repeat corrugation pattern. In some embodiments, corrugation depth "d1" is at least 8 mils (e.g., at least 10 mils, at least 12 mils, at least 14 mils, at least 16 mils), and/or at most 25 mils (e.g., at most 20 mils).

In certain embodiments, filter media 10 has a corrugation depth that is depicted by a distance "$d_2$", which is the distance from a peak of first layer 20 to a valley of first layer 20 in the repeat corrugation pattern. In some embodiments, corrugation depth "$d_2$" is at least 8 mils (e.g., at least 10 mils, at least 12 mils, at least 14 mils, at least 16 mils), and/or at most 25 mils (e.g., at most 20 mils).

In some embodiments, filter media 10 has a retained corrugation of at least 25% (e.g., at least 30%, at least 40%, at least 50%, at least 60%, at least 70%). As referred to herein, the "retained corrugation" of filter media 10 is determined by dividing the corrugation depth "$d_1$" by the distance from a peak of a side of first layer 20 to a valley of a side of first layer 20 (measured before layer 40 is applied to first layer 20) in the repeat corrugation pattern, and multiplying this value by 100%. Without wishing to be bound by theory, it is believed that the retained corrugation may result from the processes disclosed herein in which first layer 20 is formed on a separate wire from layer 30, and these layers are subsequently adhered to each other. In some instances, selecting appropriate pressure can enhance the retained corrugation, if the pressure selected is high enough to achieve desired adhesion while being low enough to achieve advantageous retained corrugation properties.

In embodiments where filter media 10 is corrugated and a roll-to-roll system is employed, as described above, to adhere a first layer 20 and a nanofiber layer 30 (e.g., formed by a meltblown process) to each other, the pressure between the rollers may be selected to achieve advantageous corrugation depth and conformity for filter media 10. In some embodiments, the pressure between the rollers may range between about 20 pounds per linear inch and about 40 pounds per linear inch (e.g., between about 25 pounds per linear inch and about 35 pounds per linear inch, between about 28 pounds per linear inch and about 32 pounds per linear inch, between about 29 pounds per linear inch and about 31 pounds per linear inch, and about 30 pounds per linear inch).

IV. Filter Assemblies and Systems

Filter assemblies for filtration applications can include any of a variety of filter media and/or filter elements. The filter elements can include the above-described filter media. Examples of filter elements include gas turbine filter elements, dust collector elements, heavy duty air filter elements, automotive air filter elements, air filter elements for large displacement gasoline engines (e.g., SUVs, pickup trucks, trucks), HVAC air filter elements, HEPA filter elements, vacuum bag filter elements, fuel filter elements, and oil filter elements (e.g., lube oil filter elements or heavy duty lube oil filter elements).

Filter elements can be incorporated into corresponding filter systems (gas turbine filter systems, heavy duty air filter systems, automotive air filter systems, HVAC air filter systems, HEPA filter systems, vacuum bag filter systems, fuel filter systems, and oil filter systems). Vacuum filter bag systems are commonly used in home vacuum cleaners. In such embodiments, a filter media can optionally be prepared by coating a paper with meltblown material. In certain embodiments, the filter media can be prepared using a wet laid or dry laid product (e.g., wood, polymer, glass). Dry laid products may be used, for example, in HVAC, HEPA, auto air and cabin air applications. The filter media can optionally be pleated into any of a variety of configurations (e.g., panel, cylindrical).

Filter elements can also be in any suitable form, such as radial filter elements, panel filter elements, or channel flow elements. A radial filter element can include pleated filter media that are constrained within two open wire meshes in a cylindrical shape. During use, fluids can flow from the outside through the pleated media to the inside of the radial element.

When a filter element is a heavy duty air filter element, each of the open and tight phases in a single filter media can, by way of example, include a mixture of softwood fibers (e.g., *Robur* Flash fibers) and hardwood fibers (e.g., Suzano fibers). The weight ratio of the open and tight phases can be about 30:70 or greater. The weight ratio of the softwood fibers and hardwood fibers in the open phase can be, for example, about 85:15, and the weight ratio of the softwood fibers and hardwood fibers in the tight phase can be, for example, about 49:51.

When a filter element is an automotive air filter element, each of the open and tight phases in a single filter media can, by way of example, include a mixture of softwood fibers and hardwood fibers (e.g., Suzano fibers). The weight ratio of the open and tight phases can be about 50:50. The weight ratio of the softwood fibers and hardwood fibers in the open phase can be about 93:7, and the weight ratio of the softwood fibers and hardwood fibers in the tight phase can be about 65:35. Each of the open and tight phases can be made from two types of different softwood fibers (e.g., Robur Flash fibers and HPZ fibers). The weight ratio of the two types of different softwood fibers in the open phase can be about 83:10 (e.g., about 83% mercerized southern pine fibers and about 10% of Robur Flash fibers). The weight ratio of the two types of different softwood fibers in the tight phase can be about 40:25 (e.g., about 40% HPZ fibers and about 25% of Robur Flash fibers).

When a filter element is a fuel filter element, each of the open and tight phases in a single filter media can include a mixture of softwood fibers and hardwood fibers. The weight ratio of the open and tight phases can be about 50:50. The weight ratio of the softwood fibers and hardwood fibers in the open phase can be about 60:40, and the weight ratio of the softwood fibers and hardwood fibers in the tight phase can be about 6:94. The open phase can be made from two types of different softwood fibers with a weight ratio of about 40:20 (e.g., about 40% HPZ fibers and about 20% of Robur Flash), and a type of hardwood fibers (e.g., about 40% of Suzano fibers). The tight phase can be made of three types of different hardwood fibers with a weight ratio of about 48:36:10 (e.g., about 48% Suzano fibers, about 36% of Tarascon fibers, and about 10% Acacia fibers) and a type of softwood fibers (e.g., about 6% HPZ fibers).

The orientation of a filter media having first and second phases relative to gas flow through a filter element/filter system can generally be selected as desired. In some embodiments, the second phase is located upstream of the first phase in the direction of gas flow through a filter element. In certain embodiments, the second phase is located downstream of the first phase in the direction of gas flow through a filter element. As an example, when the gas filter element is a gas turbine filter element or a heavy duty air filter element, the second phase can be located upstream of the first phase in the direction of gas flow through the filter element. As another example, when improved depth filtration is desired, the second phase can be located downstream of the first phase in the direction of gas flow through the filter element.

The orientation of a filter media having a nanofiber layer attached to a first layer relative to gas flow through a filter assembly/filter system can generally be selected as desired. In some embodiments, the nanofiber layer is located upstream of the first layer in the direction of gas flow through the filter assembly/system. In certain embodiments, the nanofiber layer is located downstream of the first layer in the direction of gas flow through the filter assembly/system. As an example, in some embodiments in which the gas filter system is a gas turbine filter system or a heavy duty air filter system, the nanofiber layer can be located upstream of the first layer in the direction of gas flow through the filter assembly/system. As another example, in some embodiments in which improved depth filtration is desired, the nanofiber layer can be located downstream of the first layer in the direction of gas flow through the filter assembly/system.

V. Examples

The following examples are illustrative only and not intended as limiting.

A single-phase layer and two dual-phase layers were produced from 20-30% polyester, Robur Flash fibers and HPZ XS fibers using methods described above for forming phases. Fiber sheets used to manufacture single-phase and dual-phase layers were saturated with resin binder such that the resin binder comprised 25% by weight of the sheet. The overall make up of the single-phase and dual-phase layers are provided in Table 1 and structural features of the layers can be found in Table 2 shown below.

TABLE 1

Single-Phase and Dual-Phase Layer Fiber Formulations

|  | Single-Phase Layer | | Dual-Phase Layer I | | Dual-Phase Layer II | |
|---|---|---|---|---|---|---|
| Upstream Layer (%) | 100% | | 50% | | 50% | |
| Upstream Layer (g/m²) | 125 | | 62.5 | | 62.5 | |
|  |  | Mass |  | Mass |  | Mass |
| HPZ XS 19 | 65.0% | 81 g | 70.0% | 44 g | 60.0% | 38 g |
| Polyester (6 mm, 3 denier) 10 | 20.0% | 25 g | 20.0% | 13 g | 20.0% | 13 g |
| Polyester (6 mm, 1.5 denier) 15 | 0.0% | 0 g | 0.0% | 0 g | 10.0% | 6 g |
| Robur Flash 101 | 15.0% | 19 g | 10.0% | 6 g | 10.0% | 6 g |
| Upstream Layer Total |  | 125 g |  | 63 g |  | 63 g |
| Downstream Layer (%) |  |  | 50% |  | 50% |  |
| Downstream Layer (g/m²) |  |  | 62.5 |  | 62.5 |  |
| HPZ XS 19 |  |  | 60.0% | 38 g | 50.0% | 31 g |
| Polyester (6 mm, 3 denier) 10 |  |  | 20.0% | 13 g | 20.0% | 13 g |
| Polyester (6 mm, 1.5 denier) 15 |  |  | 0.0% | 0 g | 10.0% | 6 g |
| Robur Flash 101 |  |  | 20.0% | 13 g | 20.0% | 13 g |
| Downstream Layer Total |  |  |  | 63 g |  | 63 g |

TABLE 2

Structural Properties of Single-Phase and Dual-Phase Layer

| Sample | Basis weight [g/m²] | Caliper Pressure 1N/cm² [mm] | Air permeability At 200 Pa [l/m²s] | Pore size [μm] IPA max. | Pore size [μm] IPA mean | Burst Strength Mullen [kPa] |
|---|---|---|---|---|---|---|
| Single-Phase Layer 1 | 123.4 | 0.82 | 1512 | 119.7 | 112.3 | 23 |
| Single-Phase Layer 2 | 121.6 | 0.82 | 1568 | 123.9 | 113.8 | 36 |
| Single-Phase Layer 3 | 123.6 | 0.88 | 1522 | 122.8 | 114.7 | 30 |
| Single-Phase Layer 4 | 128.1 | 0.89 | 1498 | 124.7 | 116.4 | 30.4 |
| Dual-Phase Layer 1 | 123.1 | 0.83 | 1514 | 122.1 | 117.6 | 27 |
| Dual-Phase Layer 2 | 121.2 | 0.82 | 1406 | 123.3 | 112.9 | 23.4 |
| Dual-Phase Layer 3 | 122.0 | 0.84 | 1464 | 120.7 | 114.5 | 25 |
| Dual-Phase Layer 4 | 125.4 | 0.84 | 1380 | <124.7 | 115.7 | 27 |
| Dual-Phase Layer 1 | 116.1 | 0.83 | 1606 | >124.7 | 121.3 | 29 |
| Dual-Phase Layer 2 | 123.8 | 0.85 | 1514 | 124.7 | 116.4 | 23.8 |
| Dual-Phase Layer 3 | 122.6 | 0.87 | 1496 | 124.7 | 115.5 | 27 |
| Dual-Phase Layer 4 | 124.3 | 0.91 | 1494 | 124.1 | 117.5 | 23.4 |

A nanofiber layer (0.076 mm thick, Air Perm. 207 CFM) was adhered to each of the single-phase and dual-phase layers. The nanofiber layer was a layer of polybutylene terephthalate fiber produced using a meltblown process. The nanofiber layer was measured to have a basis weight of 8 g/m², an air permeability of 207 CFM, a thickness prior to adhesion of 3 mils at 2.65 psi, and a mean flow pore size of 7 microns. The nanofiber layer was positioned downstream with respect to each of the single-phase and dual-phase layers. The nanofiber layer was subsequently adhered to each of the single-phase and dual-phase layers, using a roll-to-roll system as described earlier, with a copolyester adhesive.

Basis weight values of the nanofiber layer, the single-phase layer, and the dual-phase layer before and after adherence of the nanofiber layer were measured according to ASTM F778-88. Caliper values of the nanofiber layer, the single-phase layer, and the dual-phase layer before and after adherence of the nanofiber layer were measured under a pressure of 1 N/cm² according to TAPPI T411. Air permeability values of the nanofiber layer, the single-phase layer, and the dual-phase layer before and after adherence of the nanofiber layer were measured according to ISO 9237. Pore size values of the nanofiber layer, the single-phase layer, and the dual-phase layer before and after adherence of the nanofiber layer were measured by a method of correlating the pressure measured by a manometer from blowing air through a sample immersed in isopropyl alcohol with calibrated pore sizes. Mullen Burst strength values of the single-phase layer and the dual-phase layer before and after adherence of the nanofiber layer were measured according to DIN 53113.

Figure 7:
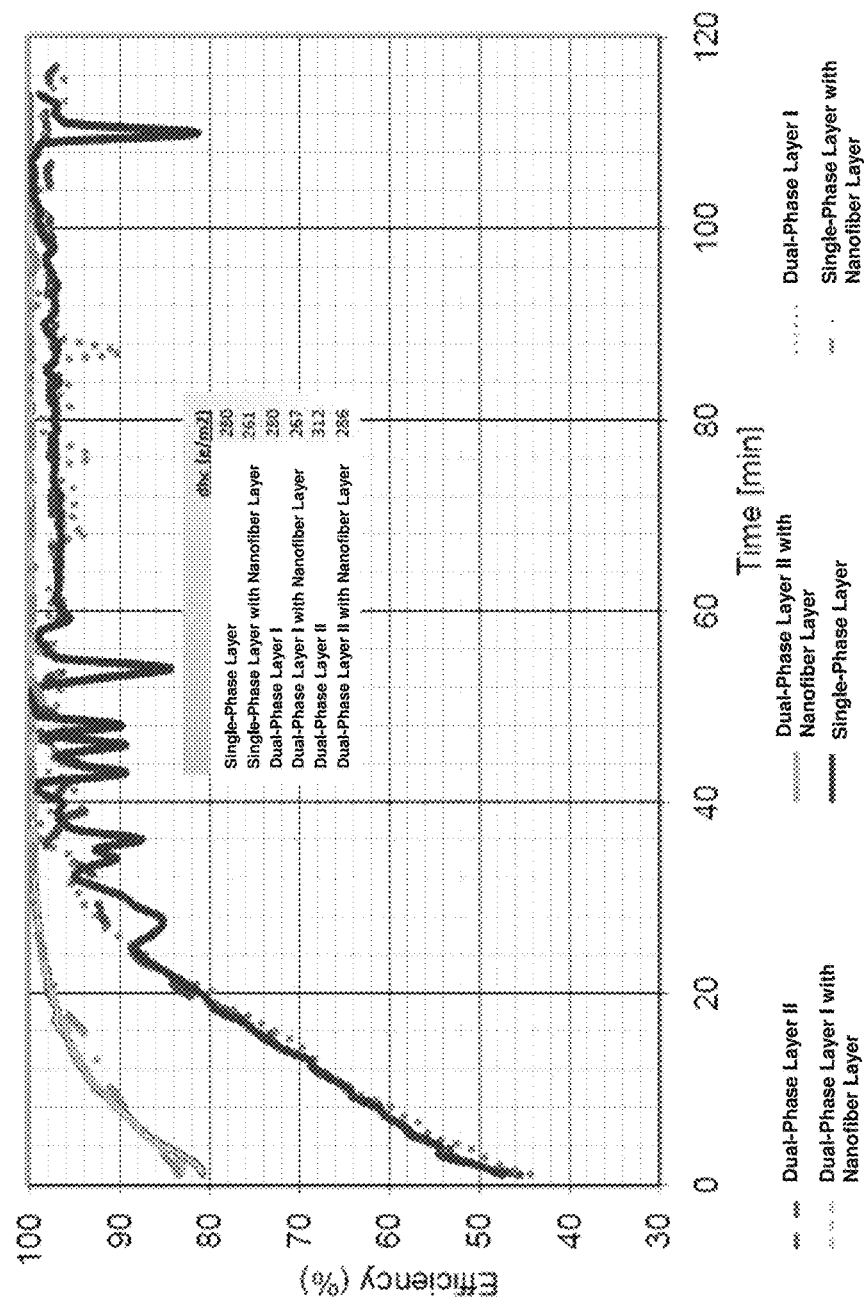
FIG. 7 illustrates a graph of performance characteristics of the examples provided.
Figure 8:
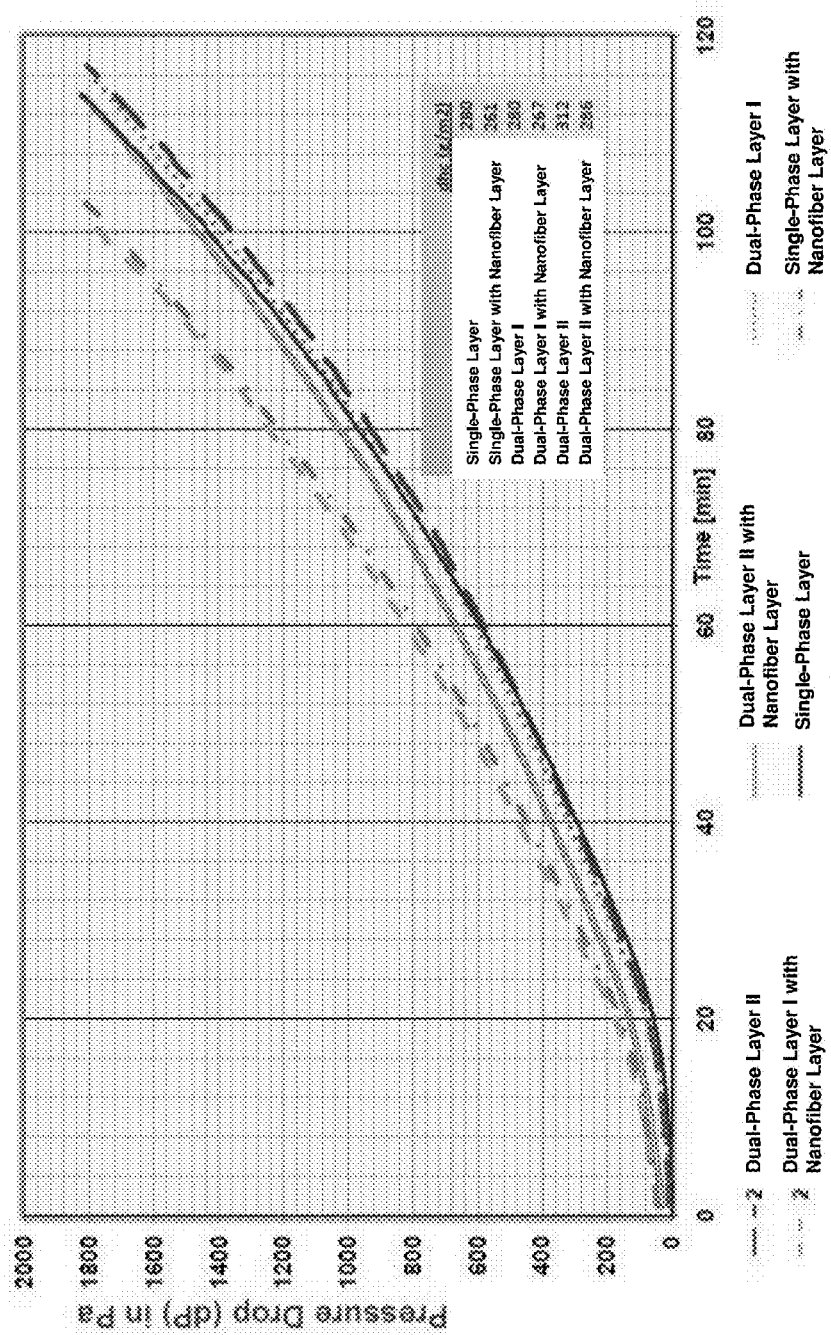
FIG. 8 illustrates another graph of performance characteristics of the examples provided.
Figure 9:
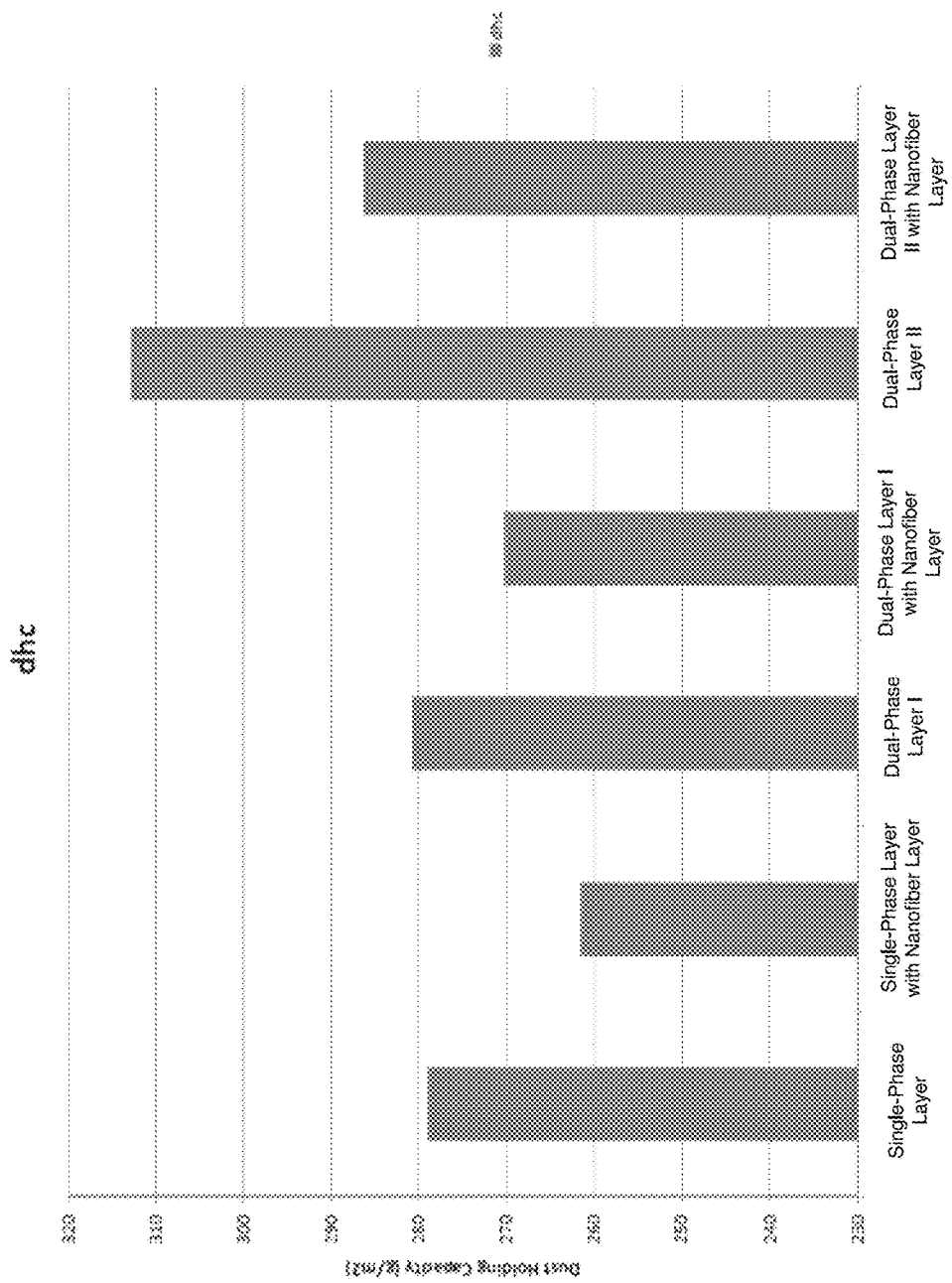
FIG. 9 depicts a graph of further performance characteristics of the examples provided.

The Palas flat sheet test was used to measure dust holding capacity, capture efficiency and pressure drop of the single-phase and dual-phase layer filter media before and after the nanofiber layer was added thereon. The test results can be found in FIGS. 7, 8 and 9. FIG. 7 illustrates the change in dust particle capture efficiency of the media for the above described examples with time. FIG. 8 depicts the change in pressure drop across the media of the above described examples with time. FIG. 9 depicts the dust holding capacities of media for the above examples.

As illustrated in FIG. 7, the nanofiber layer was observed to provide an overall efficiency between 80% and 90% on the single-phase and dual-phase layers after adherence. The increased efficiency is considered to be largely affected by presence of the nanofiber layer. Prior to adherence of the nanofiber layer, the single-phase and dual-phase layer materials had efficiencies on the order of 45%.

Further, depicted in FIG. 8, filter media composites with a nanofiber layer adhered to a single-phase or dual-phase layer exhibited dust holding capacity performances that took longer than 100 minutes to reach a pressure drop of 1,800 Pa. For instance, filter media having a nanofiber layer adhered to a single-phase or dual-phase layer exhibited nearly double the run time of similar composites not having the nanofiber layer adhered thereon, indicating a signficantly longer filter life upon addition of the nanofiber layer.

FIG. 9 depicts the dust holding capacity of the above described filter media. The single-phase layer exhibited a DHC of 280 g/m². The single-phase layer with the nanofiber layer adhered thereon exhibited a DHC of 261 g/m². Dual-phase layer I exhibited a DHC of 280 g/m². Dual-phase layer I with the nanofiber layer adhered thereon exhibited a DHC of 267 g/m². Dual-phase layer II exhibited a DHC of 312 g/m². Dual-phase layer II with the nanofiber layer adhered thereon exhibited a DHC of 286 g/m².

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The invention claimed is:

1. A filter media comprising:
   a first layer comprising:
   a first phase including a first plurality of fibers and a second plurality of fibers different from the first plurality of fibers;
   a second phase including a third plurality of fibers and a fourth plurality of fibers different from the third plurality of fibers, the third plurality of fibers being the same as or different from the first or second plurality of fibers and the fourth plurality of fibers being the same as or different from the first or second plurality of fibers, wherein the air permeability of the first plurality of fibers is greater than the air permeability of the second plurality of fibers, wherein the air permeability of the third plurality of fibers is greater than the air permeability of the fourth plurality of fibers,
   wherein the first phase has a higher air permeability than the second phase, and wherein the second phase has an average pore size of between 30 microns and 200 microns; and
   a second layer attached to the first layer, wherein the second layer is a nanofiber layer, wherein the nanofiber layer has an average fiber diameter of from 0.1 microns to 1.5 microns, and wherein the second layer comprises meltblown fibers, meltspun fibers, and/or electrospun fibers.

2. The filter media of claim 1, wherein the first layer includes a polyester fiber having a denier of between 3.0 and 6.0.

3. The filter media of claim 1, wherein the second layer comprises a meltblown fibers.

4. The filter media of claim 3, wherein the meltblown fibers include at least one of polybutylene terephthalate fibers, polypropylene fiber, nylon fibers, and thermoplastic polyurethane fibers.

5. The filter media of claim 1, wherein the filter media has a permeability of between 75 CFM and 250 CFM.

6. The filter media of claim 1, wherein one or more of the first, second, third and fourth pluralities of fibers have an average fiber length from 1.5 mm to 6 mm.

7. The filter media of claim 1, wherein one or both of the first and third pluralities of fibers comprise softwood fibers, cotton fibers, polyester fibers, polyvinyl alcohol binder fibers, or rayon fibers, and the second or fourth plurality of fibers comprise hardwood fibers, polyethylene fibers, or polypropylene fibers.

8. The filter media of claim 7, wherein one or both of the first and third pluralities of fibers comprise hardwood or softwood fibers.

9. The filter media of claim 1, wherein the first layer has a higher air permeability than the nanofiber layer.

10. The filter media of claim 1, wherein the filter media has a mean flow pore size of between 5 microns and 50 microns, and/or the nanofiber layer is a meltblown layer having a mean flow pore size of between 5 microns and 50 microns.

11. The filter media of claim 1, wherein the first layer has an air permeability between 2 CFM and 250 CFM.

12. The filter media of claim 1, wherein fibers of the nanofiber layer have an average diameter of between 0.2 and 0.8 microns.

13. The filter media of claim 1, wherein the first layer has an initial dust capture efficiency of at least 60% as measured by a Palas flat sheet test involving challenging a 100 cm$^2$ surface area of the first layer with fine dust particles (0.1-80 μm) at a concentration of 200 mg/m$^3$ with a face velocity of 20 cm/s for one minute.

14. The filter media of claim 1, wherein the filter media has a thickness of between 700 microns and 1.5 mm.

15. The filter media of claim 1, wherein the filter media has a basis weight of between 50 g/m$^2$ and 200 g/m$^2$, and/or wherein the nanofiber layer is a meltblown layer having a basis weight of from 2 g/m$^2$ to 20 g/m$^2$.

16. The filter media of claim 1, wherein the filter media has an air permeability of greater than 10 CFM and at most 200 CFM.

17. The filter media of claim 1, wherein the nanofiber layer is a meltblown layer having a thickness of at least 5 microns and at most 500 microns.

18. The filter media of claim 1, wherein at least one of the first and third pluralities of fibers are made from an organic polymeric material.

19. The filter media of claim 1, wherein a weight ratio of the first plurality of fibers to the second plurality of fibers in the first phase is between 50:50 and 97:3.

20. A filter element comprising the filter media of claim 1.

21. The filter element of claim 20, wherein the nanofiber layer is positioned downstream of the first layer.

22. The filter media of claim 1, wherein the second phase is positioned between the first phase and the nanofiber layer.

* * * * *